United States Patent
Sharma et al.

(10) Patent No.: US 11,151,584 B1
(45) Date of Patent: Oct. 19, 2021

(54) METHOD AND SYSTEM FOR COLLECTING SHOPPER RESPONSE DATA TIED TO MARKETING AND MERCHANDISING ELEMENTS

(75) Inventors: Rajeev Sharma, State College, PA (US); Varij Saurabh, State College, PA (US); Priya Baboo, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 718 days.

(21) Appl. No.: 12/220,076

(22) Filed: Jul. 21, 2008

(51) Int. Cl.
*G06Q 30/02* (2012.01)
*G06K 9/00* (2006.01)
*G06Q 30/06* (2012.01)

(52) U.S. Cl.
CPC ......... *G06Q 30/02* (2013.01); *G06K 9/00335* (2013.01); *G06K 9/00771* (2013.01); *G06Q 30/06* (2013.01)

(58) Field of Classification Search
CPC ........ G06Q 30/00; G06Q 30/00; G06Q 30/02; G06Q 30/06; G06K 9/00771; G06K 9/00335
See application file for complete search history.

(56) References Cited

U.S. PATENT DOCUMENTS 5,331,544 A * 7/1994 Lu ..................... G06Q 30/0201
705/7.29
6,659,344 B2 12/2003 Otto et al.
(Continued)

OTHER PUBLICATIONS

"An Analysis of Consumer Response to Environmentally Certified, Ecolabeled Forest Product", by Roy C. Anderson, Oregon State University; Jun. 2004.*
"Multimedia Broadcasting", m-cast; http://www.fastware.com.au/mcast.html; May 22, 2002.*
"Modeling Consumer Response to Differing Levels of Comparative Advertising", by Salvador Del Barrio-Garcia and Teodoro Luque-Martinez, University of Granada, Granada, Spain; May 2001.*
(Continued)

*Primary Examiner* — Pan G Choy

(57) ABSTRACT

The present invention is a method and system for capturing a dataset over time that represents the response of shoppers to a set of marketing and merchandising stimuli or "elements". The response includes exposure metrics, engagement metrics and conversion metrics for different shopper segments. The shopper segments may be defined by demographics such as gender, age and ethnicity or by the type of trip, such as a quick trip or a fill-up trip. The system comprises a plurality of means for capturing images, such as cameras, covering the area of interest in the vicinity of the marketing or merchandising element. The method comprises automated and semi-automated analysis of the video to extract the shopper behavior and demographics data for computing the defined metrics. The captured data can be further combined with information such a promotions and advertisement outside the store to further enhance the applications of the data collected in-store from the invention. The captured shopper data can be used for many applications such as comparison of the effectiveness of different marketing elements or the relative effectiveness of different types of promotions, variation of the relative effectiveness of different marketing elements over time or differences between the relative effectiveness of a marketing element for different demographic segments.

12 Claims, 18 Drawing Sheets

(56) References Cited

U.S. PATENT DOCUMENTS

| | | | |
|---|---|---|---|
| 6,970,830 B1* | 11/2005 | Samra | G06Q 10/0635 705/7.28 |
| 7,003,476 B1 | 2/2006 | Samra et al. | |
| 7,006,979 B1 | 2/2006 | Samra et al. | |
| 7,006,982 B2 | 2/2006 | Sorensen | |
| 7,169,113 B1 | 1/2007 | Young | |
| 7,707,059 B2* | 4/2010 | Reed et al. | 705/7.31 |
| 8,098,888 B1* | 1/2012 | Mummareddy et al. | 382/103 |
| 2002/0052776 A1* | 5/2002 | Rothman | G06Q 30/02 705/7.29 |
| 2002/0161651 A1 | 10/2002 | Godsey et al. | |
| 2002/0161909 A1* | 10/2002 | White | 709/231 |
| 2002/0178085 A1* | 11/2002 | Sorensen | 705/26 |
| 2003/0009393 A1* | 1/2003 | Norris | 705/27 |
| 2003/0039379 A1 | 2/2003 | Gutta et al. | |
| 2003/0040823 A1* | 2/2003 | Harm et al. | 700/97 |
| 2003/0078827 A1* | 4/2003 | Hoffman | 705/10 |
| 2003/0126013 A1* | 7/2003 | Shand | G06Q 30/0269 705/14.52 |
| 2004/0111454 A1* | 6/2004 | Sorensen | 708/200 |
| 2005/0216339 A1* | 9/2005 | Brazell et al. | 705/14 |
| 2006/0069679 A1* | 3/2006 | Percey et al. | 707/6 |
| 2007/0033105 A1* | 2/2007 | Collins | G06Q 30/0244 705/14.53 |
| 2008/0140508 A1* | 6/2008 | Anand | G06Q 30/02 705/14.43 |
| 2008/0172261 A1* | 7/2008 | Albertson et al. | 705/7 |
| 2008/0215462 A1* | 9/2008 | Sorensen et al. | 705/28 |
| 2008/0243614 A1* | 10/2008 | Tu et al. | 705/14 |
| 2008/0249867 A1* | 10/2008 | Angell | G06Q 30/02 705/14.26 |
| 2008/0319829 A1* | 12/2008 | Hunt | G06Q 30/0201 705/7.29 |

OTHER PUBLICATIONS

"Tracking and Activity Analysis in Retail Environments", by Alex Leykin, Indiana University, Bloomington, IN USA, Mihran Tuceryan, Indiana University Purdue University, Indianapolis, IN USA, Oct. 12, 2005.*

"Computer Vision Based People Tracking for Motivating Behavior in Public Spaces", by Jacob A. Hyman, Department of Electrical Engineering and Computer Science, Massachusetts Institute of Technology, Aug. 2003.*

"Recapturing Store Image in Customer-based Store Equity: a Constructure Conceptualization", by Katherine B. Hartman and Rosann L. Spiro, Kelley School of Business, Indiana University, Jan. 2004.*

"Modelling Consumer Response to Different Levels of Comparative Advertising", by Salvador Del Barrio-Garcia et al., European Journal of Marketing; 2003, 37, ½; ABI/INFORM Global, p. 256.*

"Event Detection and Analysis from Video Streams", by Medioni et al., IEEE Transactions on Pattern Analysis and Machine Intelligence, vol. 23, No. 8, Aug. 2001.*

"Value Allocation in Regional Shopping Center", by Mark J. Eppli, The Appraisal Journal; Apr. 1998; 66, 2; Proquest Central, p. 198.*

U.S. Appl. No. 11/805,321, Sharma, et al.
U.S. Appl. No. 11/818,554, Sharma, et al.
U.S. Appl. No. 11/901,691, Sharma, et al.
U.S. Appl. No. 12/011,385, Sharma, et al.

J. F. Cohn, et al., "Automated face analysis by feature point tracking has high concurrent validity with manual FACS coding," Psychophysiology, pp. 35-43, 1999.

I. A. Essa and A. P. Pentland, "Facial expression recognition using a dynamic model and motion energy," presented at International Conference on Computer Vision, Jun. 1995.

Y. Yacoob and L. S. Davis, "Recognizing human facial expression," University of Maryland, Technical Report CS-TR-3265, May 1994.

* cited by examiner

ONCE WE HAVE THE NORMALIZED (OR ACTUAL) FUNNEL FOR EACH ELEMENT, THE FORMULA FOR CALCULATING COMBINED EFFECT OF A SET OF ELEMENT.
IF $\alpha$ AND $\beta$ ARE THE FUNNELS FOR 2 TYPES OF ELEMENTS THEN THEIR COMBINED EFFECT CAN BE CALCULATED AS $$\gamma = (\alpha + \beta) = \sqrt{\alpha^2 + \beta^2 + \eta\alpha\beta}$$

WHERE $\eta$ IS A FACTOR THAT DECIDES WHETHER THEY ADDED TO EACH OTHERS EFFECT OR NOT
IF $\eta = 2$ THEN THEY SUPPORT EACH OTHER WITHOUT ANY INTERFERENCE.
IF $\eta > 2$ THEN THEY HAVE POSITIVE INTERFERENCE (TOTAL IS GREATER THAN SUM OF PARTS)
IF $\eta < 2$ THEN THEY HAVE NEGATIVE INTERFERENCE (TOTAL IS LESS THAN SUM OF PARTS)
SO IF THERE ARE N ELEMENTS THEN THE FORMULA GETS EXPANDED TO $$\gamma = \sum_{i=1}^{n} \alpha_i = \sqrt{\sum_{i=1}^{n} \alpha_i^2 + \sum_{i=1}^{n}\sum_{j=1}^{n} \eta_{ij}\alpha_i\alpha_j}$$

Fig. 8

STIMULUS Si                                                                    622

| ID | TRACK SEQUENCE (Xi,Yi) | TIME Tin | TIME Tout | BEHAVIOR CLASS | DEMO CLASS | EMOTION CLASS | OTHERS | ... |
|---|---|---|---|---|---|---|---|---|
| 1 | TRACK 1 | T1 | TO1 | BA1 | D3 | E4 | N/A | |
| 2 | TRACK 2 | T2 | TO2 | BE3 | D1 | E2 | N/A | |
| 3 | TRACK 3 | T3 | TO3 | BP1 | D2 | E1 | N/A | |
| 4 | TRACK 4 | T4 | TO4 | BA2 | D2 | E3 | N/A | |
| 5 | TRACK 5 | T5 | TO5 | BE1 | D2 | E3 | N/A | |
| 6 | TRACK 6 | T6 | TO6 | BE1 | D3 | E3 | N/A | |
| 7 | TRACK 7 | T7 | TO7 | BP2 | D1 | E1 | N/A | |
| 8 | TRACK 8 | T8 | TO8 | BA1 | D1 | E5 | N/A | |
| ⋮ | | | | | | | | |
| i | TRACK i | Ti | TOi | BE3 | D1 | E5 | N/A | |
| ⋮ | | | | | | | | |

Fig. 16

METHOD AND SYSTEM FOR COLLECTING SHOPPER RESPONSE DATA TIED TO MARKETING AND MERCHANDISING ELEMENTS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION—FIELD OF THE INVENTION

The present invention is a method and system for capturing a dataset over time that represents the response of shoppers to a set of marketing and merchandising stimuli or "elements," within a retail environment or "store."

BACKGROUND OF THE INVENTION

U.S. Pat. No. 7,006,982 of Sorensen (hereinafter Sorensen) disclosed a system for analyzing purchase selection behavior utilizing a visibility measure. The system uses mathematical models to define the line of sight and viewing area of the shoppers and then estimates the products the shoppers may have seen based on their shopper path. The key difference between the system disclosed by Sorensen and the current invention is that Sorensen does not formulate a scalable framework for collecting and analyzing data over large periods of time. The framework disclosed in the present invention makes it possible for us to analyze the shopper response to different store elements over time and predict their influence on shopper behavior. Sorensen also does not use automated vision algorithms for collecting shopper data. The use of vision algorithms enable automated collection of unique data not possible with any other technology.

U.S. Pat. Application No. 20030039379 of Gutta, et al. (hereinafter Gutta) disclosed a system for automatically assessing interest in a displayed product. The method includes capturing image data within a predetermined proximity of the displayed product; identifying people in the captured image data; and assessing the interest in the displayed product based upon the identified people. The key difference between the system disclosed by Gutta and the current invention is that Gutta does not formulate a scalable framework for collecting and analyzing data over large periods of time. The framework disclosed in the present invention makes it possible for us to analyze the shopper response to different store elements over time and predict their influence on shopper behavior. The system disclosed by Gutta does not track the impact of the display on shoppers' behavior. Measuring and quantifying the change in the behavior of shoppers who are attracted by a display is critical for marketers to be able to planning their retail strategies.

U.S. Pat. Application No. 20020161651 of Godsey, et al. (hereinafter Godsey) disclosed a system for tracking consumers in a store environment. The system tracks a plurality of product containers in a store environment and generates a track through the store environment representative of a continuous path followed by each of the product containers to a point-of-sale location. The system disclosed by Godsey is different from the current invention in many ways. Unlike the current invention, Godsey's system does not track shoppers in the stores, it tracks product containers and incorrectly assumes that the product containers transverse the store with the shoppers. This assumption leads to inaccurate data and consequently wrong interpretations. Another disadvantage of the system is that it cannot collect the unique types of data, such as engagement and demographics, which the current invention can.

U.S. Pat. No. 6,659,344 of Otto, et al. (hereinafter Otto) disclosed a system for automated monitoring of activity of shoppers in a market. A scanner is attached to a shopping basket, and detects (1) removal of an item from a shelf, (2) the identity of the removed item, (3) insertion of an item into a shopping basket, which may be the identical item removed from the shelf, and (4) the identity of the inserted item. The system disclosed by Otto is different from the current invention in many ways. Unlike the current invention, Otto's system does not track shoppers in the stores; it tracks products. The system can only identify shopper interactions when the shopper decides to pick up the product. It does not measure the shopper interaction funnel as disclosed in the current invention. Another disadvantage of the system is that it cannot collect the unique types of data, such as demographics and impressions, which the current invention can.

U.S. Pat. No. 7,169,113 of Young (hereinafter Young) disclosed a system for portrayal of human information visualization. The system divides the display object into a plurality of spatial regions, and viewer reactions are collected to an exposure to the display object and correlated with the spatial regions, and the display object is displayed with an aspect of the display of each spatial region being a function of the viewer reactions for the region. The system and the application are dissimilar from the current invention because it focuses on two dimensional dynamic displays only, and tests the immediate reaction to changing content in a controlled experiment.

U.S. Pat. No. 7,006,979 of Samra, et al. (hereinafter Samra U.S. Pat. No. 7,006,979) and U.S. Pat. No. 7,003,476 of Samra, et al. (hereinafter Samra U.S. Pat. No. 7,003,476) disclosed systems for analyzing the success of a marketing campaign and for defining targeted marketing campaigns using embedded models and historical data. The systems are dissimilar from the current invention because they are not focused on impact measurement of in-store marketing and merchandising elements and are not based on unique vision algorithms.

SUMMARY

The present invention is a method and system for capturing a dataset over time that represents the response of shoppers to a set of marketing and merchandising stimuli or "elements." The response includes exposure metrics, engagement metrics and conversion metrics for different shopper segments. The shopper segments may be defined by demographics, such as gender, age and ethnicity, or by the type of trip, such as a quick trip or a fill-up trip.

The system comprises a plurality of cameras for capturing images, covering the area of interest in the vicinity of the marketing or merchandising element. The method comprises automated and semi-automated analysis of the video to extract the shopper behavior and demographics data for computing the defined metrics.

The captured data can be further combined with information such as promotions and advertisement outside the store to further enhance the applications of the data collected in-store from the invention. The captured shopper data can be used for many applications, such as comparison of the effectiveness of different marketing elements or the relative effectiveness of different types of promotions, variation of the relative effectiveness of different marketing elements over time, or differences between the relative effectiveness of a marketing element for different demographic segments.

DRAWINGS—FIGURES

FIG. 8 shows exemplary mathematical equations to combine two different funnels.

FIG. 16 shows exemplary data measured by the response measurement processes in the present invention.

DETAILED DESCRIPTION OF THE INVENTION

Figure 1:
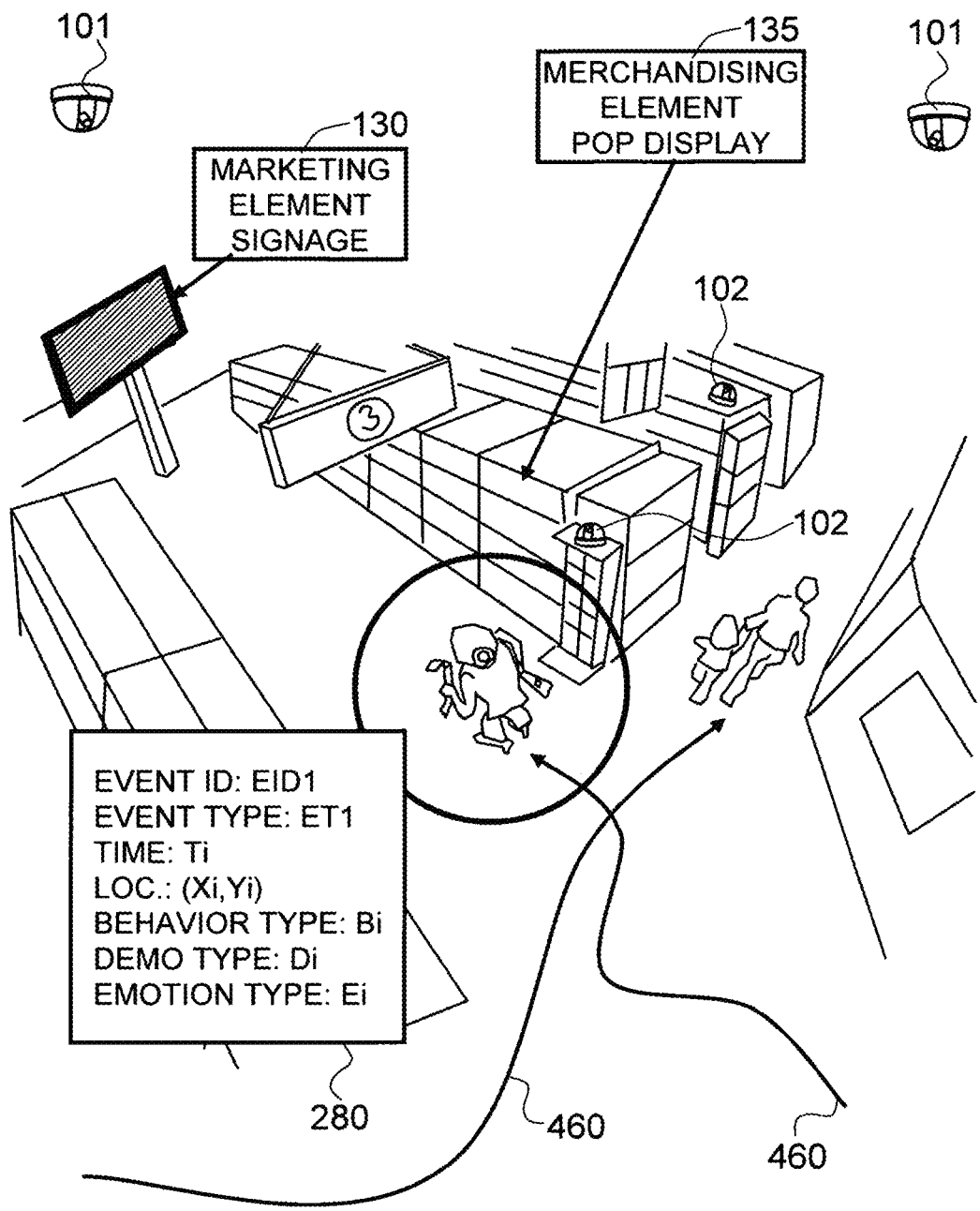
FIG. 1 shows an overview of an application of an exemplary embodiment of the present invention.

FIG. 1 shows an overview of an application of an exemplary embodiment of the present invention. The present invention is a method and system for capturing a dataset over time that represents the response of shoppers to a set of marketing and merchandising stimuli or "elements," e.g. 130 and 135 shown in FIG. 1. The present invention comprises a process of collecting in-store response and dataset tied to any kind of marketing element and stimulus.

The present invention is also a method of collecting the dataset relative to a product category or a marketing element in a retail chain. The data is generated relative to the store elements (category, product, display). The dataset captures all relevant elements of "shopper interaction" with that in-store element along with all relevant variables based on video analytics primarily using a plurality of cameras, e.g. 101 and 102. The processes measure the impact of the stimuli, and then use the result to optimize the stimuli or combination of the elements.

The present invention comprises the following key steps of:

1) collecting and arranging data in a meaningful way by detecting the presence and absence of shoppers in response to the stimulus, 2) segmenting the data, 3) correlating the data in a complicated combination of the funnel models, and 4) optimizing the stimulus.

From one aspect, the present invention is also a framework to collect and analyze the shopper's behavior inside a retail space, using automated vision algorithms, in a preferred embodiment. The framework is called the shopper marketing response data (SMD) framework.

A shopper's behavior is defined as the interactions a shopper has with different items in the store from the moment the person enters the store to the moment the person exits the store. The sum total of all shopper behaviors exhibited during one visit is called a "shopping trip." The shopping trip is primarily calculated based on the tracking information of the shoppers, e.g. 460, using the automated vision algorithms in a preferred embodiment.

The SMD framework provides a scalable and cost-effective means to collect information regarding shopper behavior over long periods of time and across multiple stores. The key advantage provided by this approach is that the data can be analyzed to identify patterns in the shopper behavior and modify the items in the store to suit the preferences of the shoppers. The data can also be easily combined with other types of data, such as advertising campaigns inside and outside the stores, to measure the changes in shopper behavior as a result of these campaigns.

A store is made up of two types of items—merchandising elements, e.g. 135, and marketing elements, e.g. 130. Merchandising elements are the fixtures, such as shelves, end caps, etc., where products which the shopper can purchase are displayed. Marketing elements, on the other hand, do not have products that a shopper can purchase. The marketing elements are placed in the store to improve the shopping experience by helping the shoppers find the products they are looking for, providing product branding opportunities, creating a cheerful surrounding, etc. Both types of elements together are referred to as store elements in the present invention.

The goal of each merchandising element is to reach the shoppers during their shopping trips, attract their attention, and convert them into buyers. Whereas the goal of the marketing elements is to reach and attract the shoppers; they do not have the final stage of interaction because they do not house products for sale. Some of the marketing elements might assist the merchandising elements in converting more shoppers. The "shopper interaction funnel" is a framework to organize shopper behavior data from the point of view of the store elements.

Figure 2:
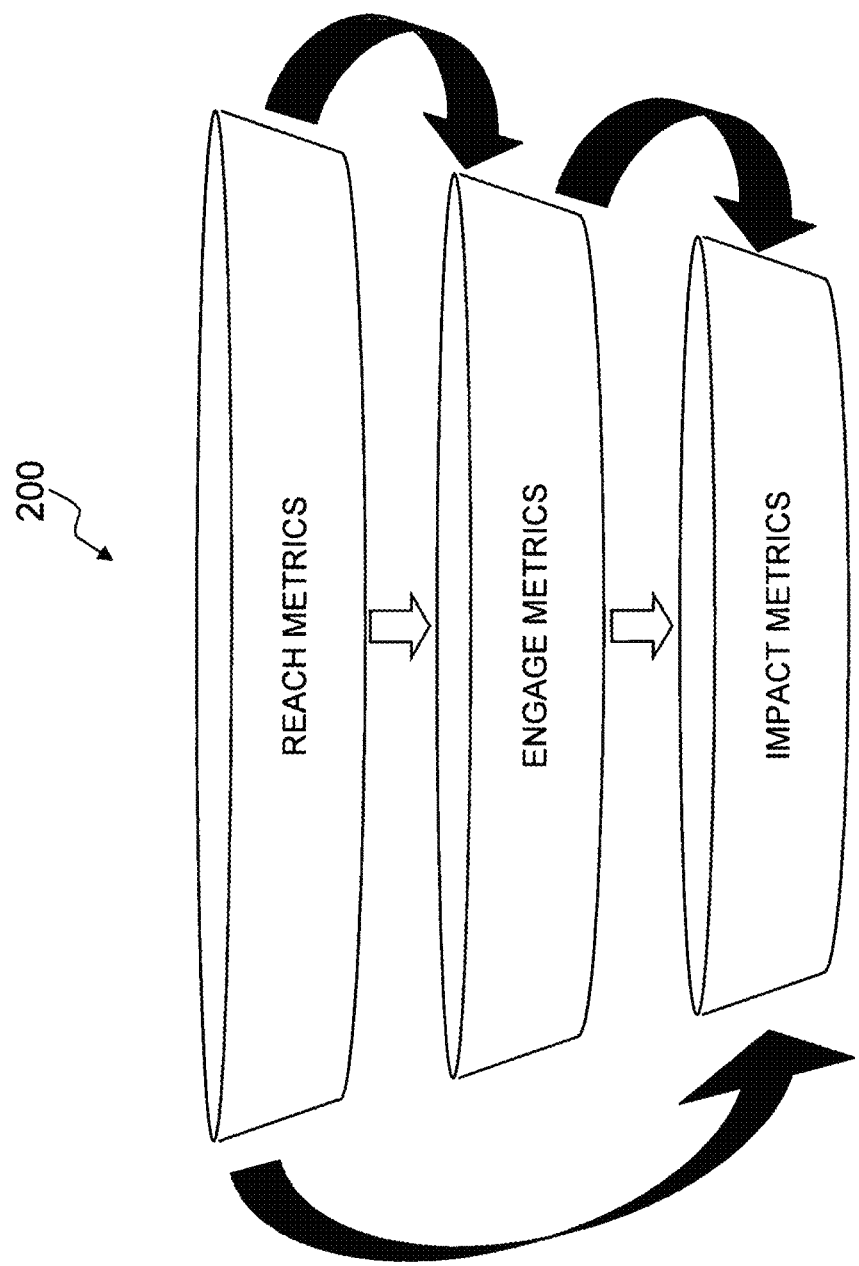
FIG. 2 shows an exemplary shopper interaction funnel (SIF).

FIG. 2 shows an exemplary shopper interaction funnel (SIF) 200.

A "funnel" allows a systematic consideration of conversion rate at multiple stages of shopper interaction along with related measurements. It also helps in understanding the reasons for conversion or lack of conversion at each stage.

In an exemplary embodiment of the present invention, multiple funnel models can be formulated, depending on what it measures. For example, a funnel model can be formulated for measuring the conversion rate for a category, and another funnel model for another category, where the categories have certain relevance among them.

The multiple funnel models can be organized in a data structure, such as a tree structure or a linked list. For example, when a category is divided into multiple subcategories, each of the subcategories can have its own funnel model for the shopper interaction and conversion rate with regard to the subcategories.

The term "category" is defined as a logical entity for a group of products, a group of product types, space, areas in a store, a display of a group of products, or a department with similar relevance in the present invention. The term "subcategory" is also similarly defined as a logical entity for a group of products, a group of product types, space, areas in a store, a display of a group of products, or a department with similar relevance, in regard to the "category" in the present invention.

The "category" can comprise a plurality of "subcategories." The type or characteristics of the "subcategory" do not have to match with those of the "category," but the "subcategory" is defined in connection with the "category" in the present invention. A category is not necessarily a spatially adjacent single entity, which means a category can consist of multiple distributed physical spaces or detached components. A set of measurements is defined in order to quantitatively measure the conversion rate from one stage to another stage among the multiple stages of shopper interaction for the funnel model.

The multiple measurements among the multiple funnel models can be combined and extrapolated to the entire store measurement. This process essentially enables the present invention to measure the shopper response in the entire store.

The SMD framework is able to support an unlimited number of correlation and coupling among the multiple funnel models. In each funnel model, the framework facilitates the analysis of correlation between stimulus and response.

The multiple funnel models can also be linked to each other, wherein intersected behaviors can be defined, and a sum of numbers between two linked funnels can be calculated for a complex analysis for the shopper response. For example, the present invention can compare the conversion ratios of the linked funnel models with regard to the intersected behavior, utilizing the measurement results for the intersected behavior in each of the linked funnel models.

In another exemplary case, the present invention can also analyze the performance level of the measurement for the intersected behavior in each of the linked funnel models, in relation to the sum of numbers between the two linked funnels. For example, an intersected behavior from a previous stage, such as the behavior of touching a product in a category, can be defined. Then, a measurement, e.g. 25%, for the conversion ratio for the intersected behavior with regard to the sum of numbers between the two linked funnels does not guarantee that the performance level of the intersected behavior in one of the linked funnel models. For example, a funnel model A indicates the same level of performance of the intersected behavior in another funnel model, e.g. a funnel model B.

In an example shown in FIG. 2, the shopper interaction funnel (SIF) 200 has three broad stages—reach, engage, and impact.

The "reach" stage is the first step in the process of converting the shoppers into buyers, and is defined as the total number of shoppers the store element had the opportunity to attract. Another way to define reach is the total number of shoppers who came within the zone of influence of an element.

The second stage in the funnel is "engage." The engage stage is defined as the engaging activities/interaction by a set of shoppers with the store element in some manner. The engaging interaction can be defined in many ways, such as stopping in front of the element, looking at it for a few seconds, physically interacting with it, or having some kind of sensory (see, touch, smell, hear) interaction. The shoppers in this stage are a subset of shoppers in the reach stage.

The final stage of the funnel is "impact", and is defined as the behaviors exhibited by the set of shoppers that engaged with the element and exhibit the concluding behavior. All shoppers in this stage are a subset of shoppers in the engage stage.

The shoppers in a lower level of the SIF are a subset of the shoppers in a higher level. But, the ratio might be more than 100% if the shoppers make multiple visits to the store element in the same trip.

Figure 3:
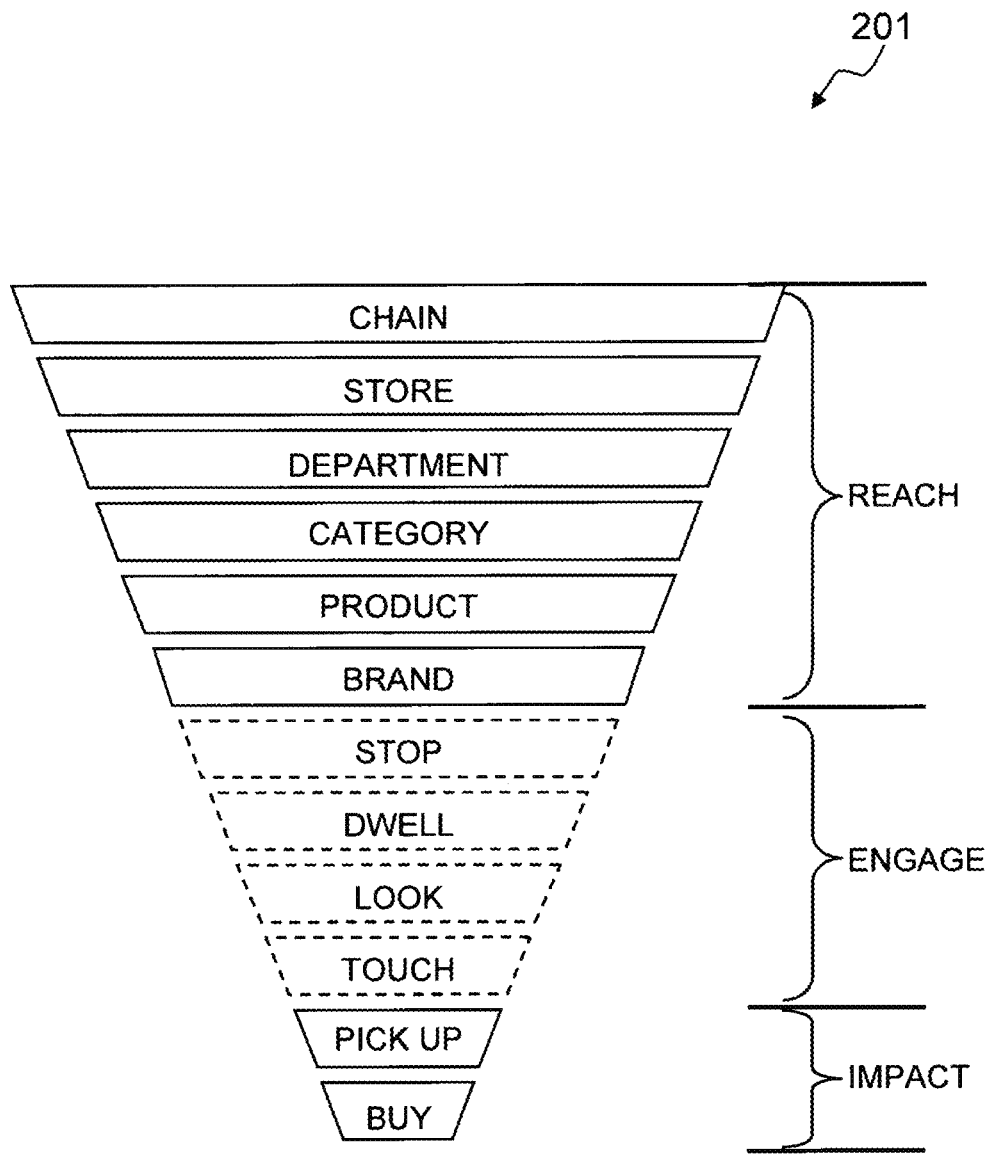
FIG. 3 shows further details of another exemplary shopper interaction funnel (SIF).

FIG. 3 shows further details of another exemplary shopper interaction funnel (SIF) 201.

Each stage in the SIF can be further broken down into intermediate stages, and specific metrics can be designed for each intermediate stage.

Some of the shoppers in the reach stage interact with the store element and thus enter the engage stage for the funnel. If a shopper comes into the aisle but does not interact with the products on display, he/she will not be considered an engaged shopper.

Engagement can be defined in different ways based on the type of element under consideration. Total time spent in the zone of influence is one possible parameter that can be used to segment the shoppers into different sub-levels of the SIF. For visual elements, the count of shoppers standing in front of or looking directly at the element is the primary parameter.

Similarly, for tactual elements the parameter can be the count of shoppers touching the element. For olfactory and auditory marketing elements, the disclosed system does not provide a method to measure engagement, however their impact can be indirectly measured by analyzing the next stage (convert) of the SIF. The total time shoppers spend engaging with the store elements (engagement duration) is a very important parameter that can be measured by the present invention. The engage stage of the funnel can be further sub-segmented into different levels based on thresholds for engagement duration.

The present invention provides methods and systems to systematically measure the shopper behavior at the stages of the shopper interaction funnel and store the data over long periods of time.

Figure 4:
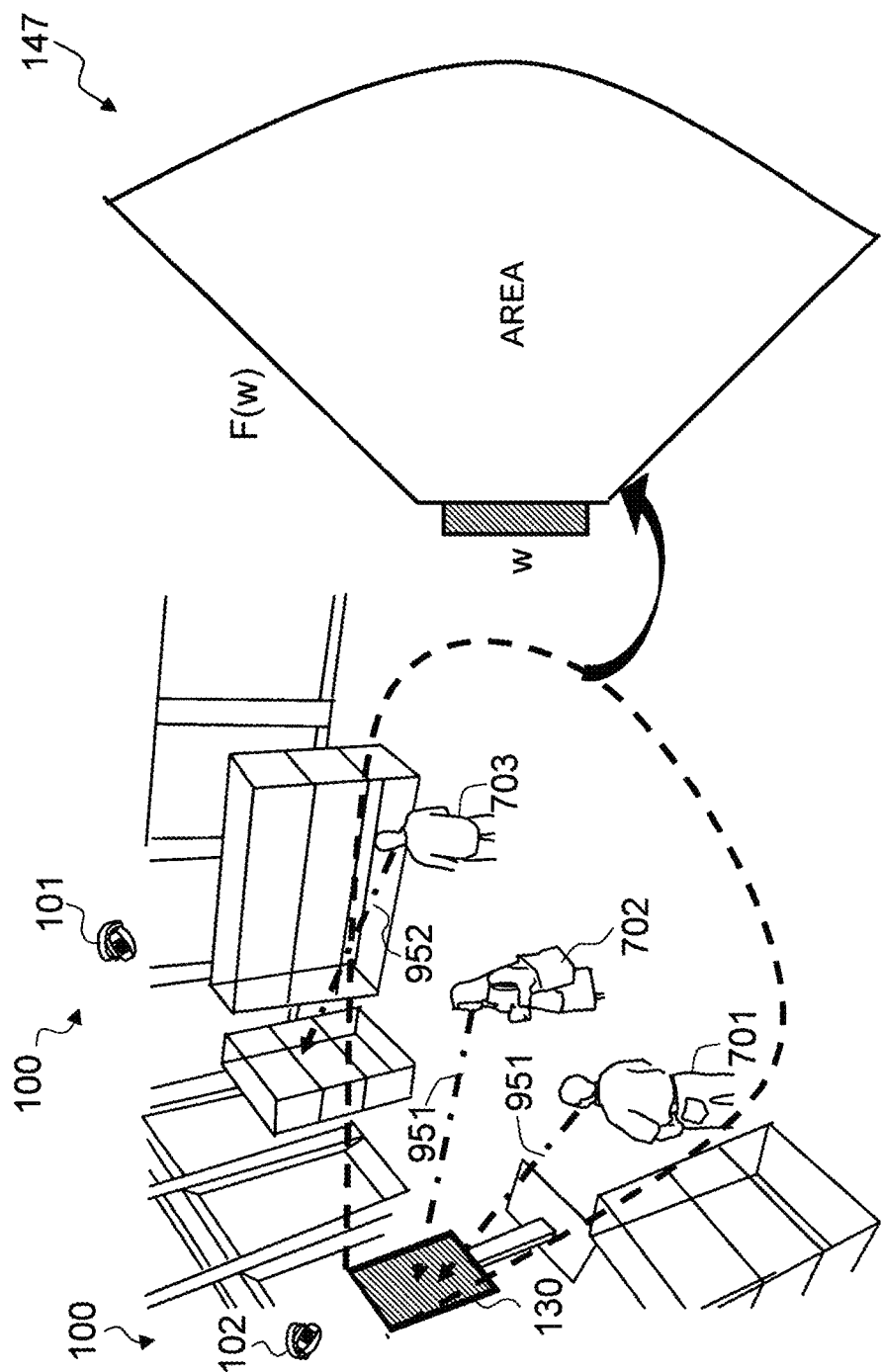
FIG. 4 shows an exemplary zone marked for the marketing element corresponding to its shopper interaction funnel.

FIG. 4 shows an exemplary zone 147 marked for the marketing element corresponding to its shopper interaction funnel.

The reach stage can be broken down based on the definition of zone 147 of influence. Zone of influence is the area surrounding the store element, where shoppers have an opportunity to interact with the element. The broadest level for the zone of influence is the entire store. Therefore, each stage in the SIF is measured as a ratio to the store traffic. A narrower definition of the zone of influence can be a department, an aisle and, at the lowest level, the immediate vicinity of the element.

In the exemplary zone 147 of influence shown in FIG. 4, the present invention measures the interactions of the shoppers in many details, along the stages in the SIF. For example, the present invention can differentiate the people, e.g. 701 and 702, who actually viewed the marketing element 130 from the people, e.g. 703, who are just passers-by, through a measurement for the attentive viewership 951 in comparison with a general looking 952, and count the number of viewers.

Figure 5:
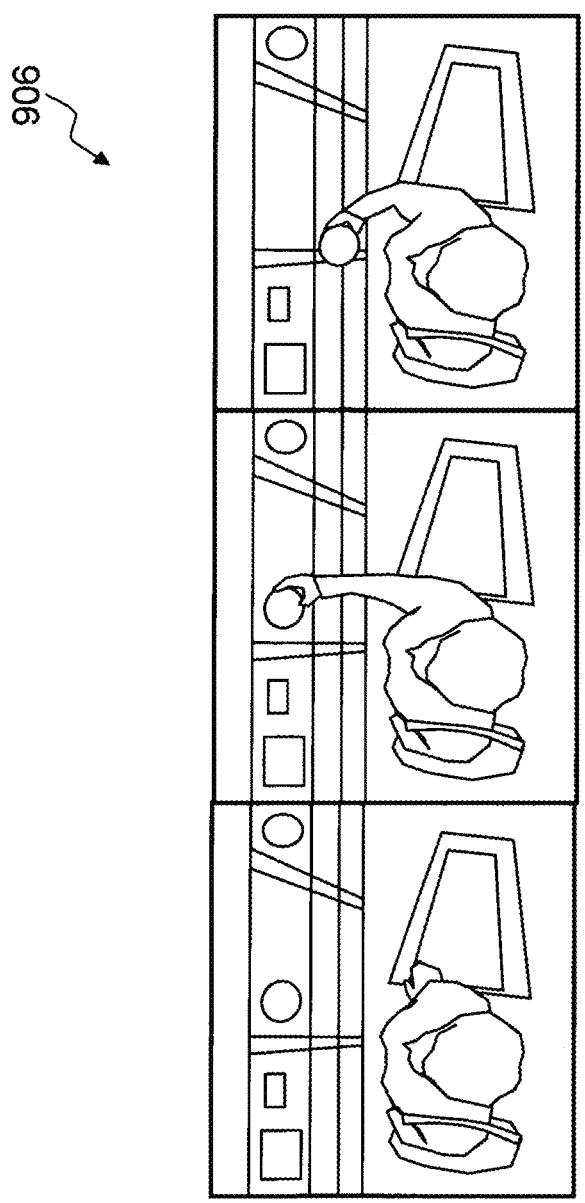
FIG. 5 shows an exemplary shopper interaction.

FIG. 5 shows an exemplary shopper interaction 906 and ways to insert more layers in the SIF. In order to provide more visibility into shopper engagement, the "engage" stage can be divided into multiple layers:

a. stopping in front of the product(s)
b. looking at the product(s)
c. touching the product(s)
d. picking up the product(s)

Utilizing a top-down camera that can be installed on the ceiling in the measurement area, the present invention can measure the stage of engagement. An exemplary method of the shopper interaction measurement based on a behavior analysis will be discussed later with regard to FIG. 15.

Figure 6:
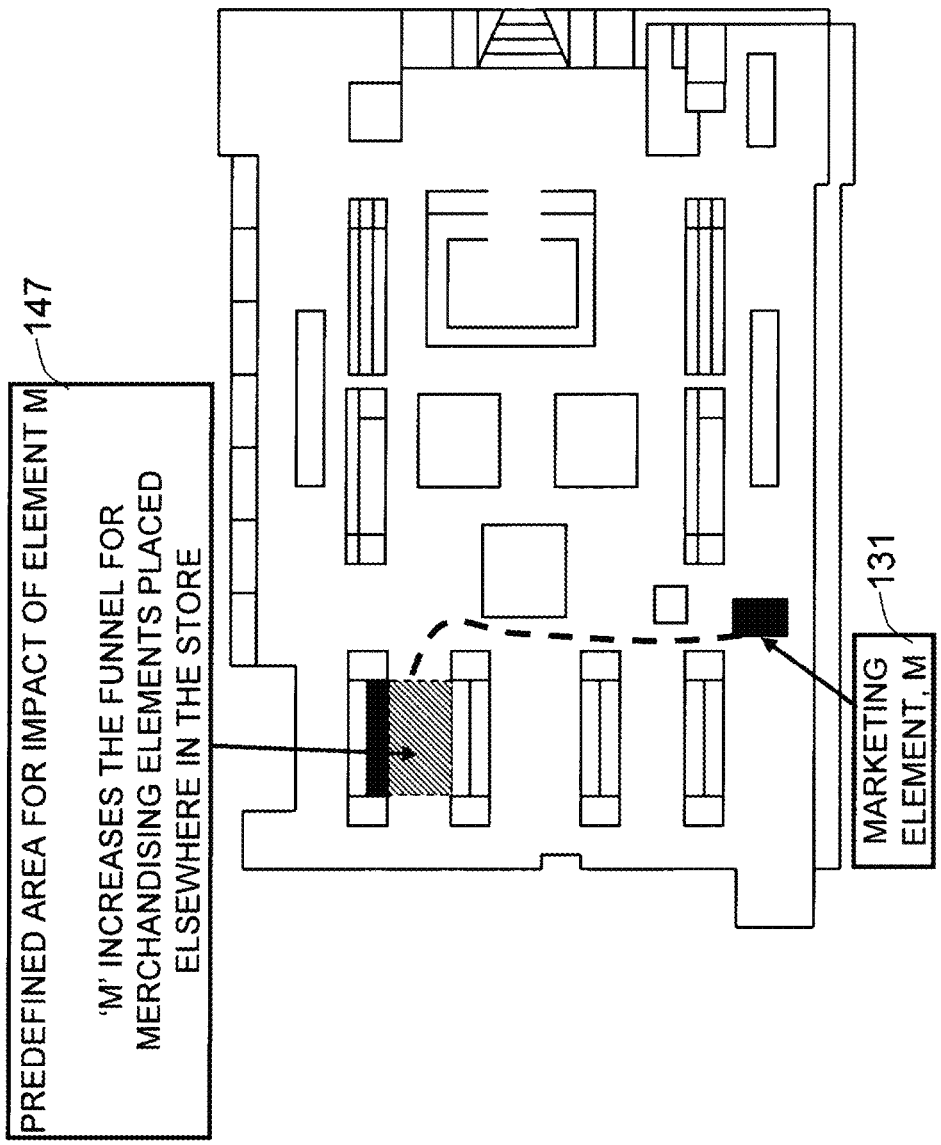
FIG. 6 shows the impact of a marketing element, defined as visiting the corresponding product category in the store after viewing the marketing element.

FIG. 6 shows the "impact" of a marketing element, defined as visiting the corresponding product category in the store after viewing the marketing element.

The impact stage of the SIF has a subset of shoppers in the engage stage who exhibited the concluding behavior. Merchandising and marketing elements differ significantly at this stage. Products are a part of the merchandising element, and the desired conclusive behavior is that the shoppers pick up the product with an intention to purchase. The intention can be defined as shoppers carrying the product with them when they leave. Another way to measure the intention to purchase will be to use the POS data to get a count of the number of people who make purchases.

As marketing elements do not house the products, this measure of concluding behavior cannot be used. The goal of the marketing element, such as the "marketing element M" 131, in the store is to encourage people to make more purchases by providing them with new information, by building brand equity, or by making the store more hospitable and friendly. Therefore, one of the ways to measure the impact of marketing elements is through measurement of the changes they bring about in the funnels of other marketing and merchandising elements, such as those located in a "predefined area for impact of element M" 147.

For example, a directional signage in front of the store may increase the reach of a merchandising element, or an informational signage next to the products many reduce the dwell time in front of the products by helping them make their decisions quickly.

In the exemplary case in FIG. 6, a customer's interaction with the marketing element at a location, e.g. LOCi, at a time of window, such as $Ti_1 \sim Ti_2$, is detected. After tracking the customer in the video images using a computer vision-based tracking algorithm, the present invention can also identify the customer's interaction with a merchandising element in another location, e.g. LOCn or the "predefined area for impact of element M" 147, at another time of window, such as $Tn_1 \sim Tn_2$. The customer's interaction duration in each location is calculated and stored in a database.

Figure 7:
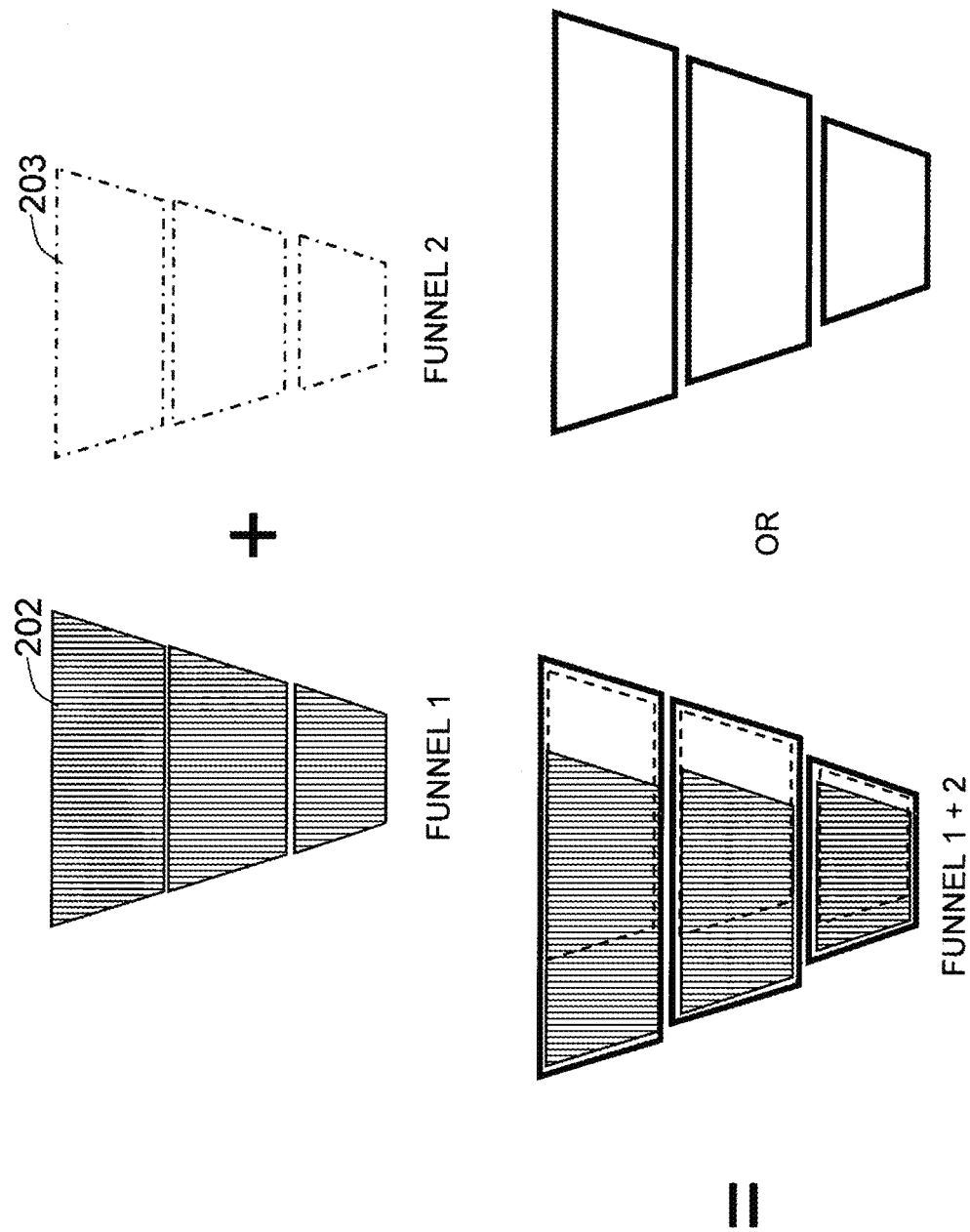
FIG. 7 shows an exemplary combination of SIFs of two elements with a similar message.

FIG. 7 shows an exemplary combination of SIFs, such as the "shopper interaction funnel 2" 202 and the "shopper interaction funnel 3" 203, of two elements with a similar message.

The SIF data gathered with the SMD framework will help facilitate different types of data analysis and modeling to estimate the SIF of different classes of elements. The analysis will also reveal the impact one element has on the SIF of another element. By combining data from external sources we can also estimate the impact of factors such as out-of-store advertising, promotions, change of seasons, etc.

Adding SIFs of Different Elements

During a shopping trip, all of the store elements in the vicinity of the shopper together form the shopping experience at that location. At any given time the shopper is surrounded by multiple elements and has the choice to engage with the ones the person finds most relevant and attractive. The elements have to compete with one another for the shopper's attention. Therefore, if a marketer places one marketing element in the store, the marketer might be able to engage 10% of the store traffic. If the marketer adds one more element with the same message, the second element might be able to engage 10% of the store traffic, but some shoppers might have engaged with both the elements. Therefore the benefit that the marketer gets out of adding the second element will be less than 10% (could be 7%). Similarly, the benefit of adding a third element will be even lower (could be 5%). On the other hand, if a competitor introduces a new element, it might negatively impact the SIF of the marketer. The extent of the impact will depend upon the marketing message and placement of the element.

Another aspect of store elements is that different types of marketing and merchandising elements have different types of SIFs. They also engage the shoppers differently. The varying degree of impact of one another's SIFs depends on the placement and type of elements. Therefore, by combining different elements, the marketers can create an effective marketing campaign that enables them to communicate with the customers. Adding extra elements will provide incremental benefits to the collective funnel. But, as the benefits diminish after a certain point, adding another sign might not provide enough return on investment.

FIG. 8 shows exemplary mathematical equations, 291 and 292, to combine two different funnels. Development of such empirical equations will help in predicting the impact of one element over another. This information will be extremely useful to the marketers for planning new campaigns.

Assume $\alpha$ and $\beta$ are funnels of two elements, A and B, which we want to combine. The combined funnel will represent the total change in the shopper behavior due to the elements.

The present invention can measure $\alpha$ by measuring the funnel of element A when B is not present in the store. Then, the present invention measures $\beta$ by measuring the funnel of element B when A is not present. Finally, the present invention measures the funnel for the combination of elements (A+B) by putting both of them in the store and measuring the funnel. The combined funnel, $\gamma$ or $(\alpha+\beta)$, is measured empirically and is also represented by the formula 291.

It can be expected to see coupling between the two elements. $\eta$ is the coupling factor between the two elements that determines where the elements support or oppose each others message.

If they support each others message, then $\gamma$ will be more than the sum of $\alpha$ and $\beta$, and n will be greater than 2.

If they neither support nor oppose each others message, then γ will be less than the sum of α and β, but more than α and β individually. η in this case will be 2.

If they oppose each others message, then γ will be less than α and β individually. η in this case will be less than 2.

If η results in −2, then the two elements are directly opposing each others message.

From the data collected with the SMD framework, the η for all combinations of elements can be calculated. The formula 292 shows an expanded version of the formula that can be used for any number of elements.

The present invention will compute values of η to predict the impact of a proposed combination of elements. Such mathematical modeling will help marketers create campaigns that maximize their goals. It will also help them model the impact that one additional element will have on the present campaign. This system will make it possible for the marketers to test ideas cost effectively.

Figure 9:
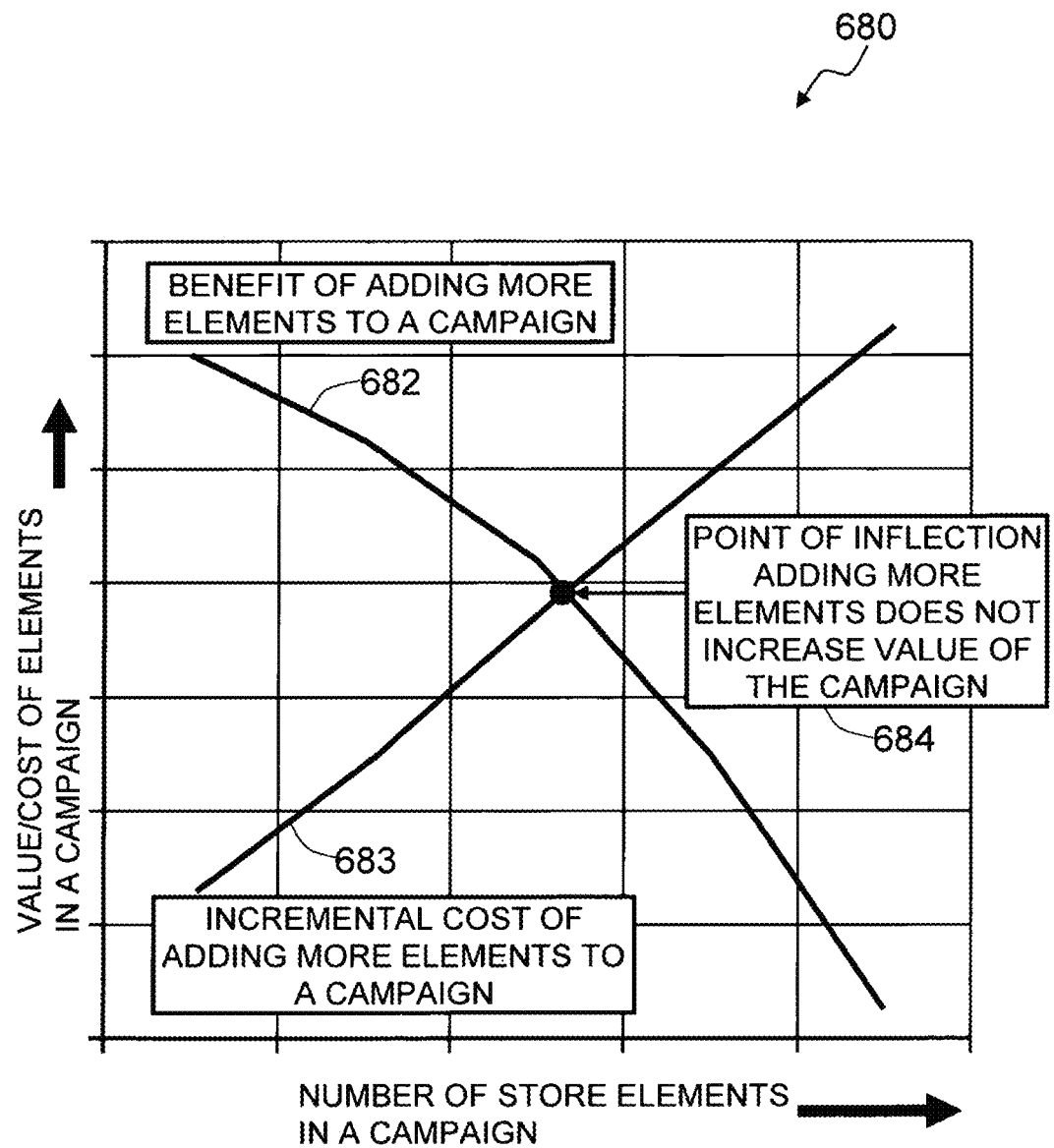
FIG. 9 shows the relationship between the benefit of adding more elements to a campaign and incremental cost of adding more elements to a campaign.

FIG. 9 shows the relationship between the benefit of adding more elements to a campaign and incremental the cost of adding more elements to a campaign in a graph 680.

The "line for benefit of adding more elements to a campaign" 682 indicates the return a marketer receives from adding new elements. The line has a negative slope because each element the marketer adds to his or her campaign has a diminishing impact, as some of the shoppers will have already converted into buyers due to the elements that are already a part of the campaign.

The "line for incremental cost of adding more elements to a campaign" 683 represents the cost of adding a new element. As the marketer adds more elements, the necessary investment will go up; therefore, this line has a positive slope.

The "point of inflection" 684 is the point where these two lines meet, and represents the most effective marketing campaign. If the marketer adds more elements than those at the point of inflection, the cost of the additional element will not be justified.

This is another exemplary application that can be built using the data and data modeling techniques in the SMD framework. This application will help marketers save money by optimizing marketing campaigns before rollout.

Figure 10:
FIG. 10 shows an exemplary planogram and categories of a retail space for which the present invention is applied.
Figure 11:
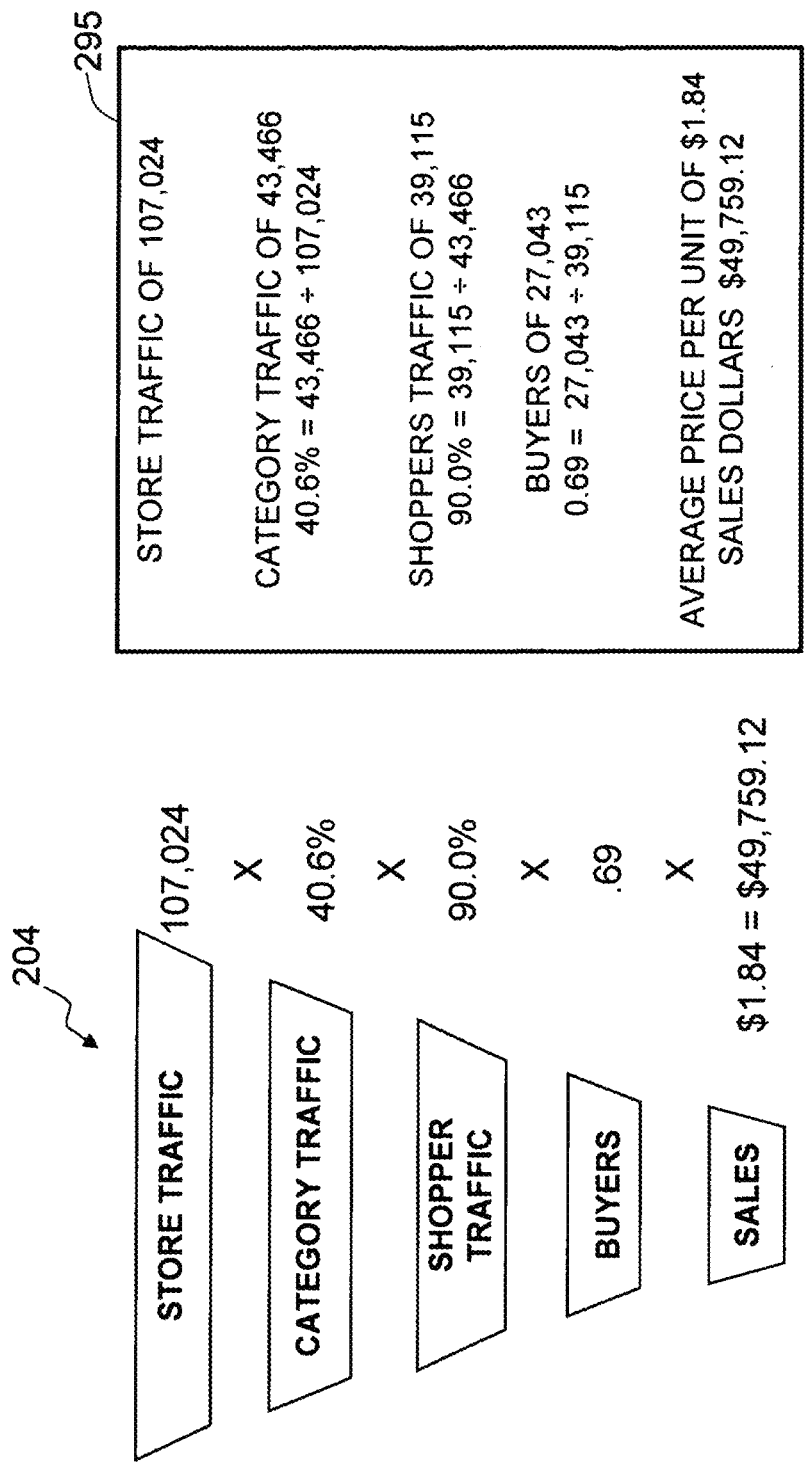
FIG. 11 shows exemplary calculations between stages in a funnel model.
Figure 12:
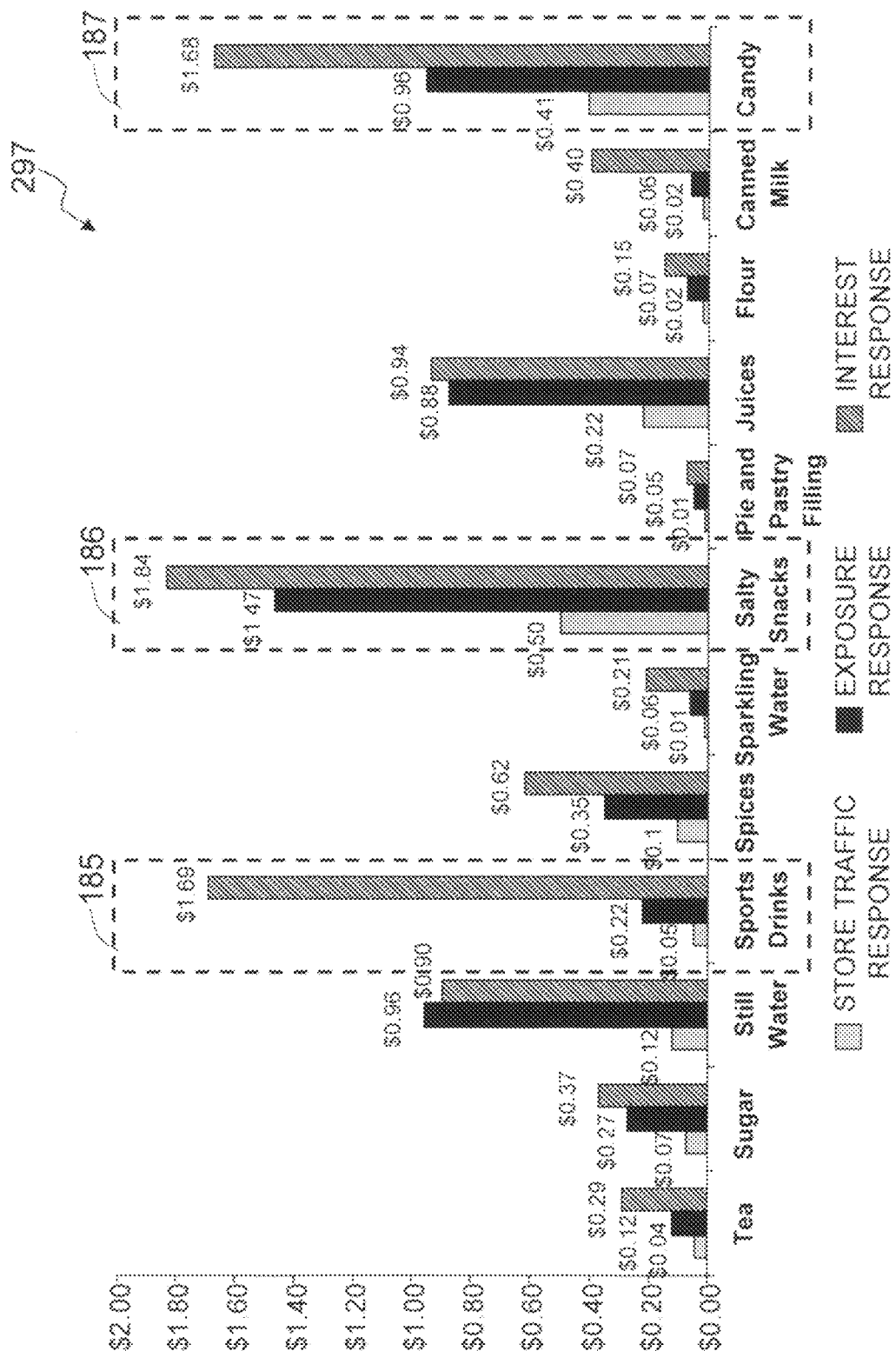
FIG. 12 shows exemplary conversion ratios for each metric.

FIG. 10 through FIG. 12 show exemplary output data that were calculated in an exemplary store by the present invention.

FIG. 10 shows an exemplary planogram and categories of a retail space for which the present invention is applied.

In the example shown in FIG. 10, the "table 1" 621 shows fifteen different categories, with various sizes and locations, defined in the exemplary store. The planogram 605 visualizes the locations of the categories in the store in a quick and schematic manner.

FIG. 11 shows exemplary calculations 295 between stages in a funnel model 204.

At each stage, the present invention detects the customers' target behavior and calculates the numbers, such as the number of customers in a category for a traffic count. Based on the numbers between the layers, the present invention calculates ratios along the funnel model for the category, and finally produces a dollar value for the category sales. For example, at the buyer stage, there were 27,043 buyers out of 39,115 shoppers, which results in 69% of conversion, and finally a dollar value of $49,759.12 in the exemplary calculation.

The ratios between each stage are important indicators of the capability of the merchandising element (in this case, product shelves) to reach and convert the store traffic into buyers. These ratios for similar elements in different stores are collected and normalized to eliminate any impact of spatial arrangement of the element and geographical differences. The end result of the exercise is a generic SIF for the element. A similar SIF is created for each element.

In the next step, the impact of individual elements on one another is isolated. This data can be used to predict the ability of a new combination of these elements to attract and convert the shoppers into buyers.

FIG. 12 shows exemplary conversion ratios for each metric.

In the example, the SIF data was used to develop custom metrics to show conversion ratios between sales and individual steps of the SIF. FIG. 12 shows customers' store traffic response, exposure response, and interest response to different merchandising elements for different categories in the store. These metrics help the retailer identify categories that have the most effective shopper interaction funnels. In the example, three categories, 185, 186, and 187, were identified to have the highest growth potential. The merchandising elements in each of the categories were small and did not have high reach, but performed very well in the other two parts of the SIF—engage and impact. This shows that these categories have the highest potential to grow and receive the highest priority.

Figure 13:
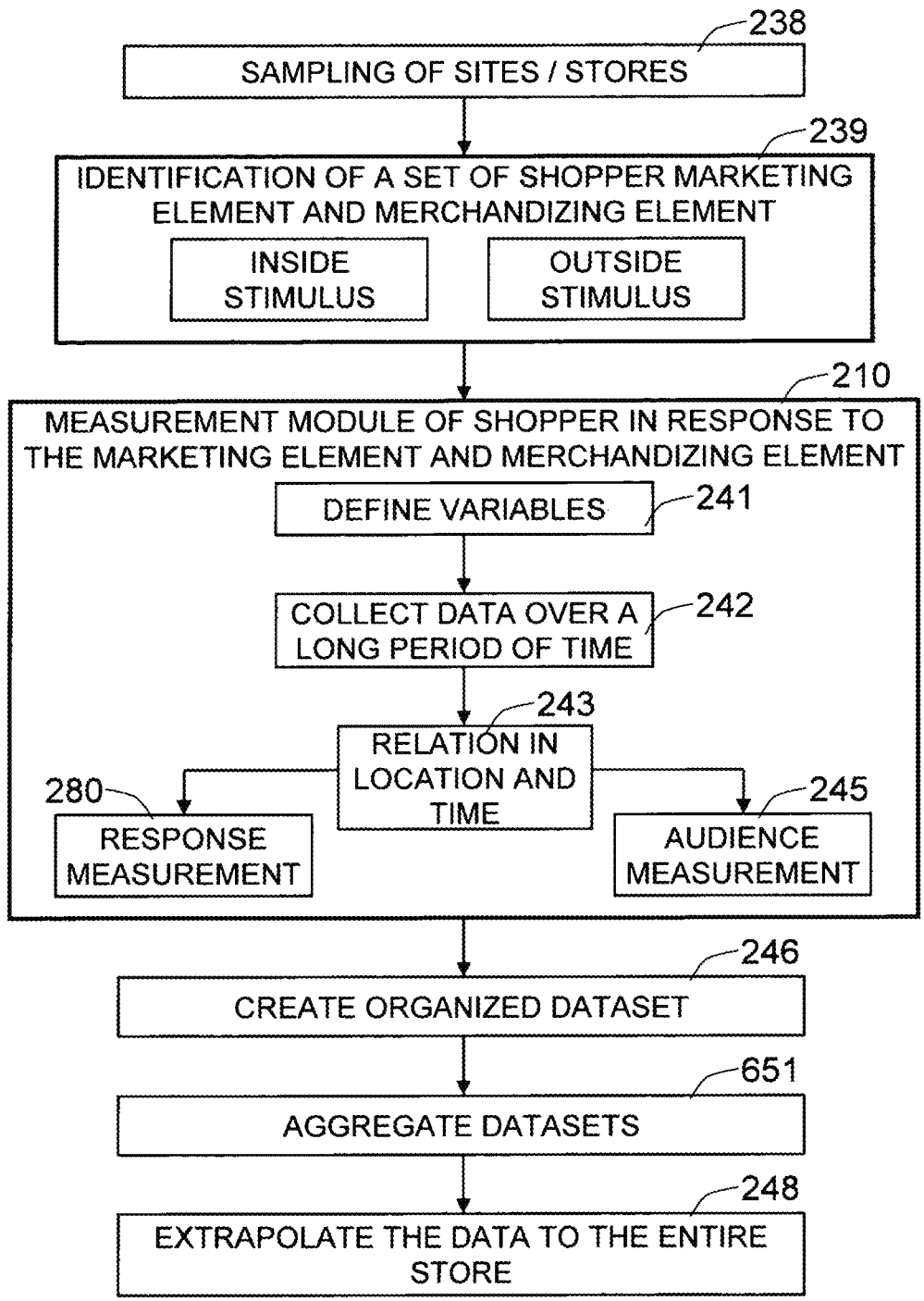
FIG. 13 shows an exemplary framework and processes of relating the data with respect to the location and time.

FIG. 13 shows an exemplary framework and processes of relating the data with respect to the location and time.

The present invention is a unified framework that allows any number of engagement layers in the framework and compares all of the responses in a uniform manner with respect to stimulus.

In an exemplary embodiment, the key processes in the framework comprise the following steps:
1) sampling of stores 238,
2) identifying a set of shopper marketing elements and merchandising elements in the target area 239,
3) measuring shopper behavior in response to the shopper marketing element and merchandising element 210,
4) defining a set of variables for the response measurement 241,
5) collecting data over a long period of time 242,
6) correlating the measured response 280 and audience 245 data, based on the location and time 243,
7) creating an organized dataset per funnel model 246,
8) aggregating the organized datasets 651, and
9) extrapolating the datasets to the entire store 248.

Exemplary behaviors in the measurement of shopper behavior include various types of behaviors, such as stopping and looking, and the output of the measurement can be stored as relational data.

Stimulus

As discussed above, the stimulus primarily refer to marketing elements and merchandising elements in the present invention. The stimulus can be divided into an outside store stimulus and inside store stimulus, and some examples of the stimulus can comprise the following items:
(1) outside store stimulus
free standing insert
announcement, information to customers
(2) inside store stimulus
merchandise, category, layout,
display, scent, sensory, schedule of promotion, prize,
non-visual stimulus, such as audio,
consumers promotion,
trade promotion,
in-store marketing,
other types—event marketing.

The stimulus can be organized into multiple levels, where examples of the levels comprise: category level, store level, chain level, and channel level.

Response

The response includes exposure metrics, engagement metrics, and conversion metrics for different shopper segments.

The measurement method in the preferred embodiment of the present invention is an automated measurement based on computer vision algorithms. However, the present invention also comprises semi-automated analysis of the video to extract the shopper behavior and demographics data for computing the defined metrics. Semi-automated methods can be included using an efficient user interface to gather the stimulus data and the response data, and correlate them.

The response measurement measures different types of behaviors. Some examples of the different types of behaviors comprise:
the number of trips,
time spent in a location,
the number of stops,
the number of looks,
the number of touches,
the number of predefined interactions, and
the number of purchases, in relation to a funnel model.

Although segmentation is not the direct response of the customers, as a part of the step for analyzing the audience of the stimulus, the segmentation data, such as demographics, is also measured at this step. The shopper segments may be defined by demographics, such as gender, age and ethnicity, or by the type of trip, such as a quick trip or a fill-up trip.

The present invention measures not only the response to stimulus but also the relationship among the stimulus responses relative to each other. One of the relationships among the gathered data is calculated with respect to the location and time.

Synchronization

The data is time synchronized with other non-proprietary datasets. The datasets comprise sales, promotional schedules, store clusters by formats, location demographics, etc. for entire chain(s).

Syndicated Data

The goal of the syndicated data is to remove randomness that is specific to a certain category or store from the measurement of the category or store, i.e. measurement of the shopper response to the stimulus in the category or store, in the present invention. This enables the present invention to have representative data measurement and metrics for a store and remove systematic error. For example, dwell time in multiple categories can be adjusted relative to aisle length, so that the absolute dwell time in a shorter aisle will not have a skewed result compared to the other longer aisles. The process of normalizing the absolute values to a specific range, such as between 0 and 1, is a way to remove the randomness and to have a syndicated data in the present invention.

With respect to the syndication, the present invention creates the standardized indices, which includes time share, category share, and dollar share of customers, in response to the stimulus.

The captured data can be further combined with information such as promotions and advertisements outside the store to further enhance the applications of the data collected in-store from the invention.

Metrics

The behavior analysis generates metrics with regard to the brand or product. The exemplary metrics comprise: exposure metrics, engage metrics, and conversion metrics.

The metrics that are produced show the impact of marketing beyond exposure.

Exemplary types of metrics comprise:
change in shopper behavior,
change in immediate reaction, such as reach for a product,
change in category dynamics, such as category traffic, penetration, and conversion rates,
activity map,
shopping time,
shopper demographics,
primary, secondary destinations,
direction of the travel, and
change in sales.

The combined dataset will be created by extrapolating the behavior and demographic information to obtain a chain-wide dataset. The framework facilitates the extrapolation of a measurement to a large number of stores in a chain. The parameters, which are measured and associated with for the extrapolation, comprise planogram: layout of stores, total population of the areas where the stores are located, and predefined characteristics of behavior.

Figure 14:
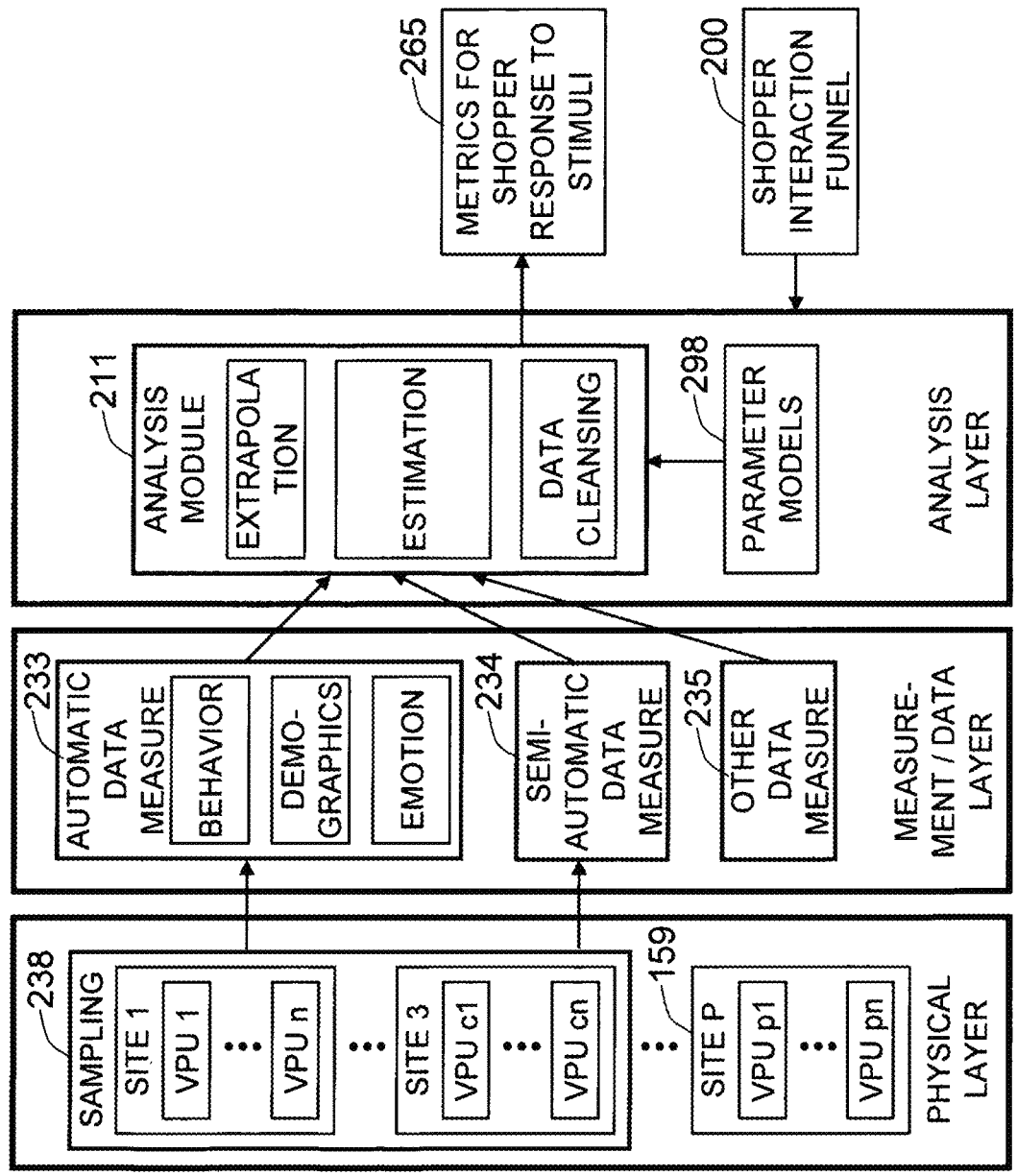
FIG. 14 shows layers of the shopper measurement module in further detail.

FIG. 14 shows layers of the shopper measurement module 210 in further detail. The module consists of three layers. The first layer is the physical layer, consisting of video processing units (VPUs). These units consist of a plurality of cameras, installed in the retail space and connected to servers that convert the video stream into behavior and audience data. Some other types of specialized hardware may be used to perform this step. The cameras 100 are set up in a way to cover a portion of the entire retail space under consideration. The cameras 100 may be installed in a sample of stores and in a sample of locations within the store to build a representative sample.

The second layer is the measurement and data layer. The VPUs use automated video processing 233 algorithms to convert video into audience data. The audience data is broadly classified into behavior, demographics, and emotion. Behavior data consists of the actions performed by the audience, such as visits to store sections, places at which the audience stopped, products with which the audience interacted, etc. The demographic data consists of an audience profile, such as age, gender, and ethnicity. The data will be used to segment the audience into logical groups based on advertisers' needs. The emotion data consists of the emotional changes of people in response to the stimulus.

Additional data can be collected using semi-automated methods 234. The video processing algorithms facilitate the process of collecting these data points by indexing the videos based on specific criteria. The indexed videos that are annotated by humans generate the data for further analysis.

The data can be further augmented by combining external data sources 235 that enhance the value of analytics. Examples of such data points include, but are not limited to, lifestyle, income, and media consumption information about the expected audience members.

The third layer is the analysis layer. The actual audience data, generated from the sample stores, is used to extrapolate the audience data and generate the estimated audience data for the entire network of retail locations. The analysis module 211 uses the outputs from the measurement layer and cleans the data by removing corrupt or incomplete datasets. It then combines the data with applicable statistical parameter models 298, such as distributions, and produces the dataset for shopper response. The dataset is converted to the metrics for shopper response to stimuli 265 according to the shopper interaction funnel 200.

Figure 15:
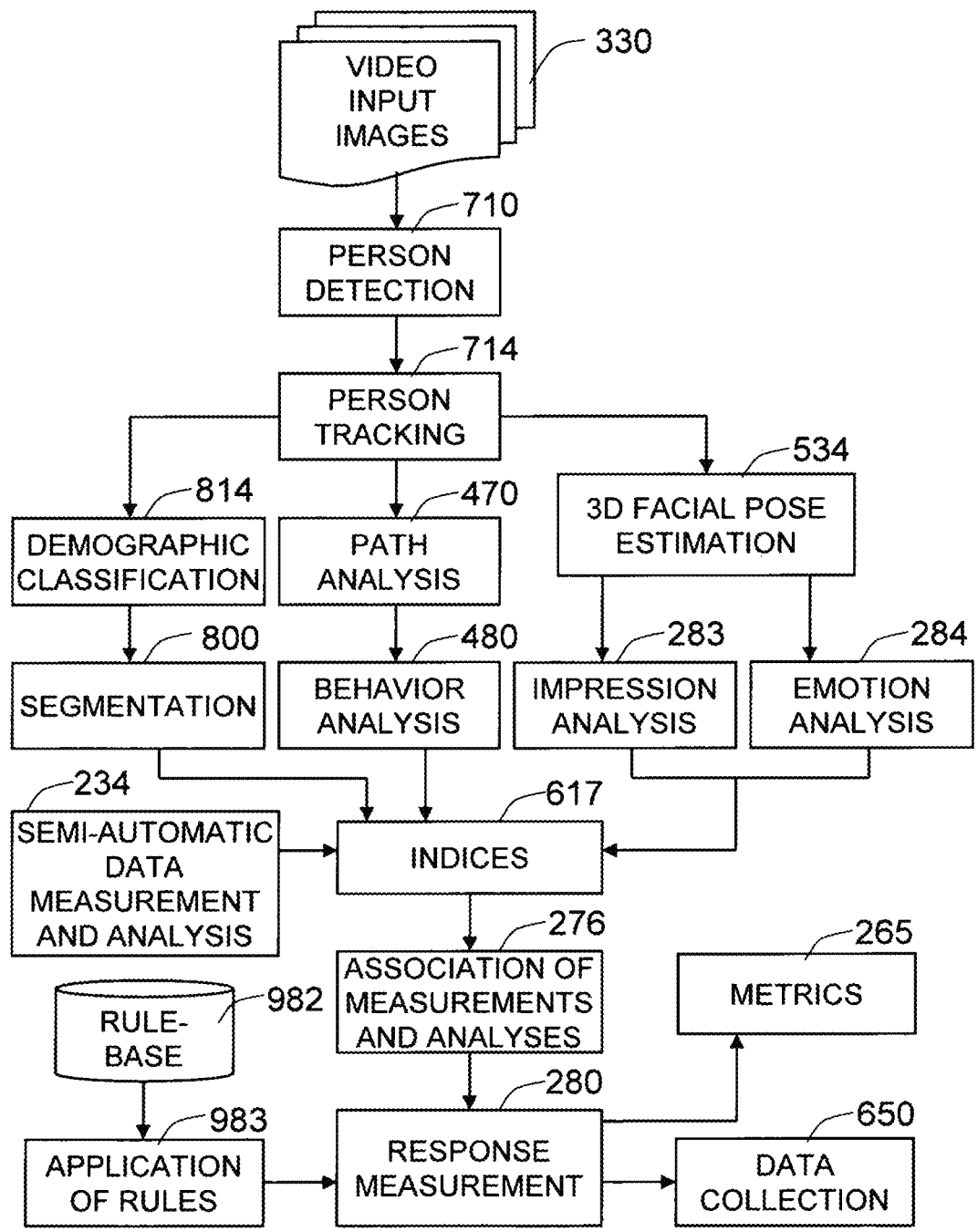
FIG. 15 shows exemplary response measurement processes in the measurement and data layer, in which computer vision-based behavior analysis and segmentation measurement, i.e., demographics classification, impression analysis, and emotion analysis, are combined in an exemplary embodiment of the invention.

FIG. 15 shows exemplary response measurement processes in the measurement and data layer, in which computer vision-based behavior analysis and segmentation measurement, i.e., demographics classification, impression analysis, and emotion analysis, are associated in an exemplary embodiment of the invention.

In a preferred embodiment, the present invention processes the video-based analysis automatically. However, in another exemplary embodiment, the present invention can process the video-based analysis semi-automatically 234, where a semi-automatic annotation tool is used in combination with automatic behavior analysis, demographic analysis, and emotion change detection. The present invention can utilize an efficient video annotation tool, such as that disclosed in U.S. patent application Ser. No. 12/011,385 of Sharma, et al. (hereinafter Sharma Ser. No. 12/011,385).

The present invention can organize the measurement of the response to the stimulus based on the segmentation and trip of the people. The segmentation comprises demographic segments, including age range, gender, and ethnicity. The trip comprises the shopping pattern of the people.

Further, the present invention can evaluate the engagement process of the person with each stimulus in granular detail in an exemplary embodiment. The granular detail comprises the behavior of reading labels, comparing products, comparing marketing or merchandising elements, sniffing products, and other physical interactions with the product, or marketing and merchandising elements.

In the exemplary embodiment shown in FIG. 15, the present invention detects 710 and tracks 714 a person, such as a customer, in the video input images 330, from a plurality of cameras 100. The present invention can join the trajectories of the person tracks from a video from a set of cameras 100 to another video of from a set of cameras 100 while the person appears and disappears between the fields of view among a plurality of cameras 100. Based on the tracking information, the present invention performs the path analysis 470 of the particular person. The path analysis 470 can be used as one of the ways to process the behavior analysis 480 of a person and obtain useful information about the person's behavior, such as engagement behavior with the digital campaign.

The present invention can utilize any reliable video-based tracking method for a single customer and a group of customers in the prior art, in regards to the behavior analysis. For example, U.S. patent application Ser. No. 11/901,691 of Sharma, et al., (hereinafter Sharma Ser. No. 11/901,691) disclosed an exemplary process of video-based tracking and behavior analysis for a single customer or a group of customers, using multiple cameras in a preferred embodiment of the invention, based on the spatial and temporal attributes of the person tracking.

The present invention can also process segmentation 800 of the people, based on the images of the people in the video. Demographic classification 814 is an exemplary segmentation 800 of the people.

The present invention can utilize any reliable demographic composition measurement method in the prior art as an exemplary video-based segmentation of the people. For example, U.S. patent application Ser. No. 11/805,321 filed on May 23, 2007 of Sharma, et al., (hereinafter Sharma Ser. No. 11/805,321) disclosed an exemplary demographic composition measurement based on gender and ethnicity.

The segmentation 800 and behavior analysis 480 data are used to produce indices 617, and the indices 617 are sent to the module for the association of measurements and analyses 276, which performs the response measurement 280.

Impression analysis 283 and emotion analysis 284 are carried on images of the people in relation to the marketing and merchandising elements to measure the impact of the marketing and merchandising elements on the people.

The impression measurement module counts and measures the impression length. The impression measurement module can also process a deeper impression analysis in correlation with other parameters, such as the duration of viewing time for a particular marketing and merchandising element per demographic segmentations. With regard to the impression count and measurement, the present invention can utilize any well-known impression measurement method. U.S. patent application Ser. No. 11/818,554 filed on Jun. 14, 2007 of Sharma, et al., (hereinafter Sharma Ser. No. 11/818,554) disclosed details of a system for measuring the impression level through the viewership of people. An exemplary embodiment of the present invention shown in FIG. 15 can utilize Sharma Ser. No. 11/818,554 for the impression measurement in the impression analysis 283, especially utilizing the 3D facial pose estimation 534.

The impression analysis 283 and emotion analysis 284 measurements are very important for understanding the impact of the marketing and merchandising elements on the people who were exposed to it. The measurements can teach us to understand whether the marketing and merchandising elements were engaging enough to hold the attention of the people, and whether the marketing and merchandising elements produced the desired emotional change in the people.

In an exemplary embodiment, the impression analysis 283 module can utilize other variables to measure the deeper level of impression. The other variables can comprise the relationship of the marketing and merchandising elements with the surrounding marketing and merchandising elements, demographic segmentations, and temporal attributes.

For example, a more than average number of impression counts for a marketing or merchandising element in relation to a specific demographic group indicates that the marketing or merchandising element was able to attract and engage the specific demographic group in a particularly meaningful pattern. Likewise, the impression count data can be analyzed to measure the impact to each predefined demographic group in relation to the particular marketing or merchandising element. Each metric gives a measure of response to the marketing and merchandising elements as a whole and individual graphics. A marketing or merchandising element that can attract more people and engage them longer can be considered better than the other marketing and merchandising elements that do not.

The emotion analysis 284 module measures the emotional response people have to a given marketing or merchandising element. Whenever a person engages with a marketing or merchandising element, his or her facial expression could change in reaction to the marketing or merchandising element.

Usually the goal of the marketing or merchandising element is to entice a positive and happy response. The degree (valance) by which a person reacts to a marketing or merchandising element will be measured using vision-based technologies. A set of video input images 330 is provided to the emotional change detection sub-module that measures the magnitude of the emotional change.

This reaction is defined as the persuasiveness of the marketing or merchandising element. The average of all emotional reactions to a marketing or merchandising element can be considered as the unified emotional response to the marketing or merchandising element. The following equation gives an exemplary way to calculate persuasiveness.

$$\text{persuasiveness} = \frac{k}{\text{Total\_impressions}} \sum_{n=1}^{k} \partial emotion_n$$

Where k is the total number of impressions that had an emotional response to the marketing or merchandising element $\partial emotion_n$ is the change in response associated with the nth impression.

Several approaches exist for analyzing static images of faces to track the expressions and estimate the emotional state of a person. For example, J. F. Cohn, A. J. Zlochower, J. Lien, and T. Kanade, "Automated face analysis by feature point tracking has high concurrent validity with manual FACS coding," Psychophysiology, pp. 35-43 1999 (hereinafter Cohn), focus on classification of static images of the face, which are associated with expression of particular emotions. Several approaches have also been reported for analyzing a sequence of images for facial expression analysis and estimating the emotional state of a person. For example, I. A. Essa and A. P. Pentland, "Facial expression recognition using a dynamic model and motion energy," presented at International Conference on Computer Vision, June 1995 (hereinafter Essa) disclosed an automated system for facial expression detection using optical flow coupled with a physical model of face muscles to describe the facial motions, and Y. Yacoob and L. S. Davis, "Recognizing Human Facial Expression," University of Maryland, Technical Report CS-TR-3265, May 1994, (hereinafter Yacoob) followed a three-level recognition approach based on the optical flow of points with high gradient values. The above methods aim at classifying low-level facial expressions into FACS type Action Units (AUs).

The present invention can utilize an approach for measuring the change in emotion in response to a marketing or merchandising element from an analysis of the change of the facial expression, as suggested in Cohn and Essa. Specifically, the present invention can detect a positive or negative change in the "valence" of the emotion so that it can be used as a measure of persuasiveness of the marketing or merchandising element.

The measured data can be stored in a database at the data collection process 650. The analysis of the measured data can be further facilitated by applying 983 a set of predefined rules in a rule base 982.

FIG. 16 shows exemplary data measured by the response measurement processes in the present invention.

The exemplary table 622 for the response measurement comprises information for the track sequence, start and end time of the tracking, behavior class, demographic class, and emotion class, in each of the track sequences for customers in the captured images for an exemplary stimulus, i.e. "stimulus i", based on the response measurement methods discussed above. The table can also contain other input that is useful for measuring the customers' response, including values captured by a semi-automatic method.

Figure 17:
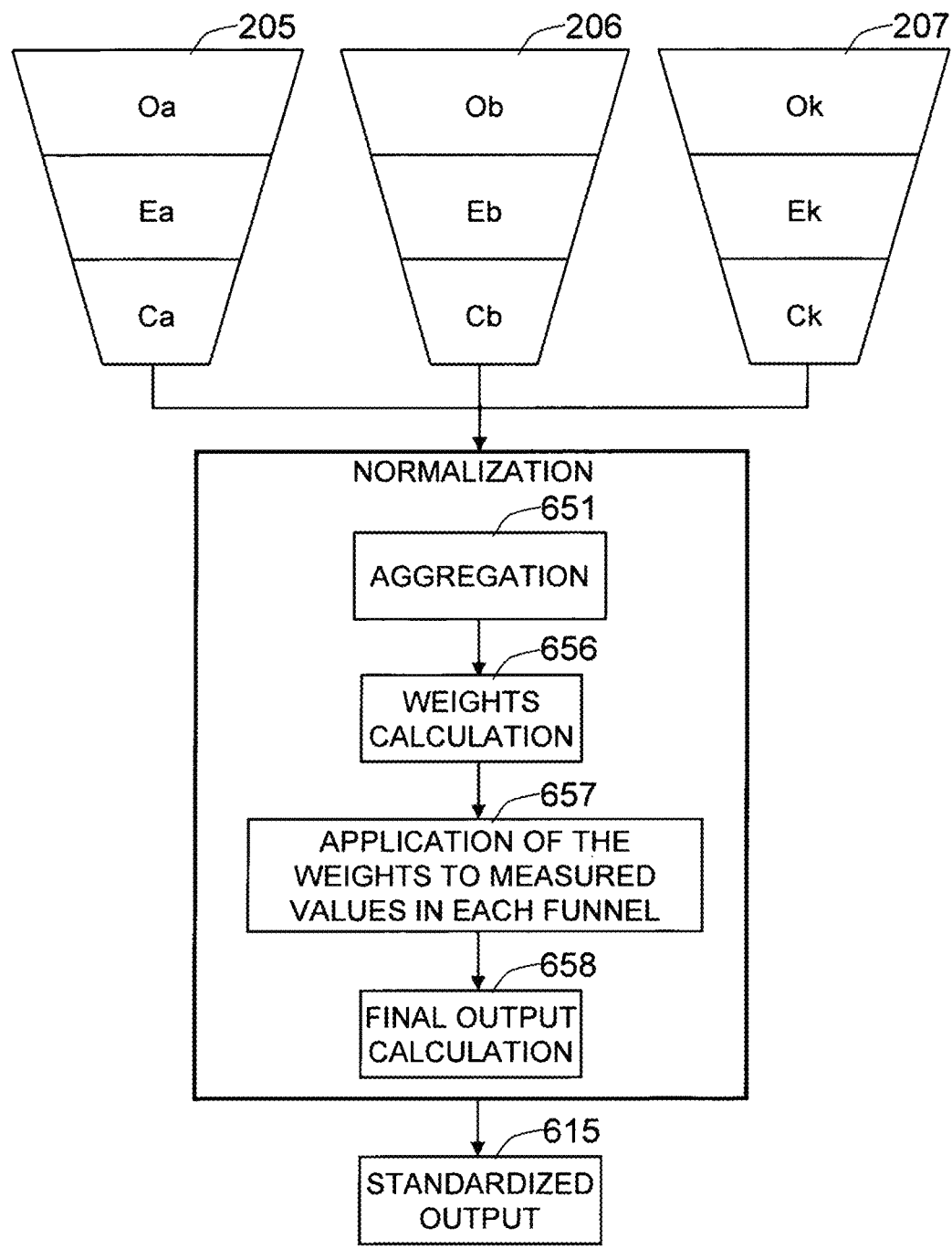
FIG. 17 shows the exemplary process of normalization.

FIG. 17 shows the exemplary process of normalization.

As a part of having the syndicated data, the "normalization" of all of the metrics involved in the funnel is one of the key processes in the framework. Especially, when the present invention compares the measurements from a plurality of funnel models, the normalization is a feature that allows correct comparisons, averaging across disparate types of stores, across different product categories, etc.

The goal of the syndicated data is to remove randomness that is specific to a certain store from the measurement of the store in the present invention. This enables the present invention to have representative data measurement and metrics for a store and remove systematic error.

In the exemplary embodiment shown in FIG. 17, the measurement from a plurality of funnel models, such as "shopper interaction funnel 5" 205, "shopper interaction funnel 6" 206, and "shopper interaction funnel n" 207, are aggregated 651.

Depending on the environment of the category where each funnel model is formulated, different weights are calculated 656. For example, dwell time in multiple categories can be adjusted relative to aisle length by using different weights. The absolute dwell time in a shorter aisle will not have a skewed result compared to the other longer aisles by having greater weight value.

The process of normalizing the absolute values to a specific range, such as between 0 and 1, is a way to remove the randomness and to have a syndicated data in the present invention. The normalization can be applied before calculating the final output.

After the application of the weights to normalized measured values in each funnel 657, a final output is calculated 658, such as an average of weighted values.

With respect to the syndication, the present invention can convert the final output to a standardized output 615, which includes time share, category share, and dollar share of customers in response to the stimulus. Based on the standardized output 615, the framework can uniformly represent the performance of stimulus, and facilitate the comparison of performance outputs among multiple stimuli.

Figure 18:
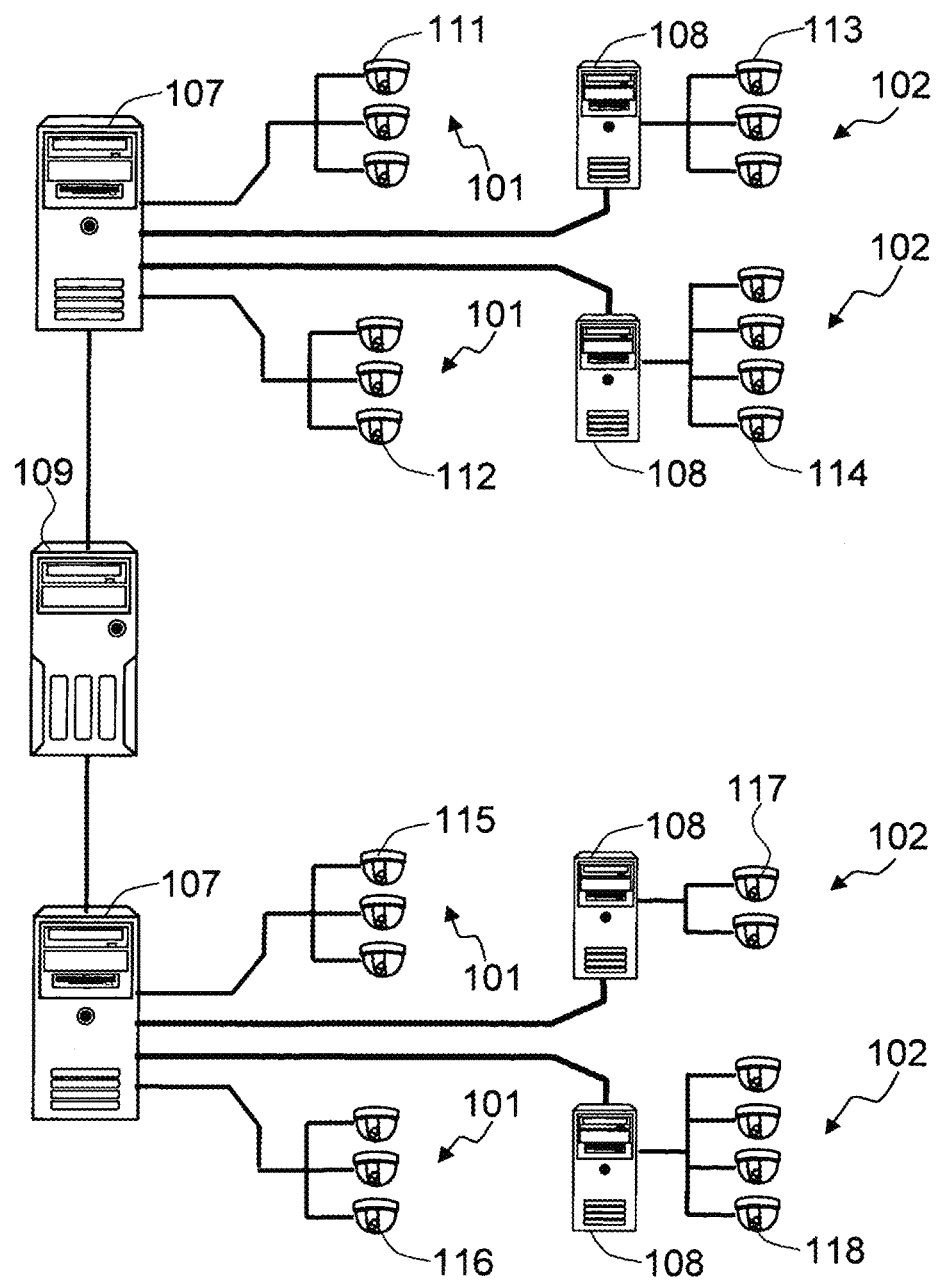
FIG. 18 shows an exemplary network of a plurality of computers for control and processing, and a plurality of cameras for capturing images in the present invention.

FIG. 18 shows an exemplary network of a plurality of computers and a plurality of cameras for capturing images in the present invention, where the network consists of a first computer 107 and a second computer 108, which communicate with each other to synchronize the time-stamped lists of measurements among a plurality of video streams captured by the cameras in the measured locations.

In the exemplary embodiment, a plurality of cameras, i.e., a plurality of first cameras 101, are connected to the video interface in a first computer 107.

The sensors are placed in a distributed architecture to facilitate the measurement of the response data. If the distance between the plurality of cameras is greater than a computer can handle, e.g., in order to cover the multiple areas for the marketing or merchandising elements that are located far from each other, the plurality of cameras can be connected to multiple video interfaces.

For example, in the exemplary embodiment shown in FIG. 18, a plurality of first cameras 101, such as a "camera 1" 111 and a "camera 2" 112, are connected to the video interface in a computer 107 that is different from the first computer 107 of another plurality of first cameras 101, such as a "camera 5" 115 and a "camera" 116. The plurality of computers can be connected in a local area network and communicate with each other.

In an exemplary deployment of the system that embodies the present invention, the camera 101 can be installed where the field-of-view can cover the traffic of the people in the measured location and the camera 102 can be installed in the vicinity of a marketing or merchandising element in the location for the close view of the people. The cameras are connected to the video interface through cables.

The digitized video data from the video interface is transferred to the computer that executes computer vision algorithms on the data. The computer can have internal means for storing data or external means for storing data.

The camera can comprise an analog camera, USB camera, or Firewire camera. The video interface, which can comprise a video frame grabber, USB interface, or Firewire interface, are typically included in the same enclosure as the computer.

The computer can be a general purpose personal computer, such as a Pentium 4 PC, or a dedicated hardware that can carry out the required computation. The computer, as well as the video interface, can be placed locally or remotely, as long as the connection to the camera can be established.

The internal means for storing data, such as internal hard disk drives, is placed within the same enclosure as the computer. The network storage driver or internal hard disk drives contained in a remote computer, can be placed locally or remotely, as long as data can be transferred.

In an exemplary embodiment, a general purpose USB webcam can capture images. A Pentium 4 2.8 GHz PC having 1 GB memory can serve as a computer, where a generic USB interface included in the PC's motherboard can serve as a video interface. A generic IDE hard disk drive can serve as the internal data storage or the external data storage.

The present invention can generate time-stamped measurements in accordance with the behavior analysis, segmentation, and impression analysis measurement, utilizing a time server 109. The exemplary time server 109 can maintain a synchronized time in the network of means for control and processing. In another exemplary embodiment, a first computer 107 can act as a server, and a plurality of second computers 108 can act as clients. The server can run its own local clock or be connected to a global time server 109 for the synchronization utilizing a time synchronization protocol, such as the Network Time Protocol (NTP). The time-stamped measurements facilitate the synchronous comparison among multiple location configurations.

The number of cameras per a computer varies, depending on the system configuration in the physical space. However, each computer knows the location and the identification of each of its associated plurality of cameras and the area covered by the cameras.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A data collection method for collecting in-store responses and datasets of people tied to marketing and merchandising elements, the method comprising the following steps of:

a) receiving, by a computer from a video processing unit comprising at least a camera that is connected to at least a video interface to capture, a set of video images in a retail space, b) converting the set of video images to audience data by executing a video processing algorithm, wherein each video image comprises image data and audience data that comprises behavior, demographic, and emotion data, c) analyzing a plurality of input images to estimate shopper interactions, segmentation, impression level, valences and magnitudes of emotion change, and a unified emotional response of the people, wherein the analysis includes executing computer vision algorithms and 3D facial pose estimation algorithms on the input images, wherein a unified emotional response is considered the persuasiveness of a set of marketing and merchandising elements, wherein a persuasiveness is calculated by and equation $$\text{persuasiveness} = \frac{k}{Total_{impressions}} \sum_{n=1}^{k} \partial emotion_n,$$

wherein k is a total number of impressions that had an emotional response to the set of marketing or merchandising elements and demotion is the change in response associated with the nth impression, d) measuring the responses of the people tied to marketing and merchandising elements based on the analysis for shopper interactions, segmentation, impression level, valences of emotion change, and a unified emotional response, e) creating one or more datasets by accumulating the response measurements, f) segmenting the datasets according to demographic information of the people, g) formulating, by the computer, one or more in-store shopper interaction funnel models in relation to the response measurements, wherein the shopper interaction funnel models allow a systematic consideration of conversion rates at multiple stages of shopper interaction along with related response measurements, wherein the shopper interaction funnel models are organized in a data structure that includes a tree structure or a linked list, h) correlating the response measurements with conversion rates at multiple stages of shopper interaction, i) linking the multiple in-store shopper interaction funnel models, defining a set of intersecting behaviors and calculating a sum of numbers between two linked shopper interaction funnel models for an analysis of the response measurements wherein a computer vision-based demographic composition measurement technology measures the demographic information, and wherein the method normalizes values of the datasets, j) measuring the impact of a first set of marketing and merchandising elements through the measurement of changes occurring in the shopper interaction funnel models of a second set of marketing and merchandising elements, wherein the impact is measured through an equation $\gamma = \sqrt{\alpha^2 + \beta^2 + \eta\alpha\beta}$, wherein $\gamma$ is a combined funnel of funnels $\alpha$ and $\beta$, wherein $\eta$ is a coupling factor between the two funnels that determines whether the first and second set of marketing and merchandising elements support, oppose or do not have an effect on each other, and k) optimizing, by the computer, the funnel model using the in-store marketing and merchandising elements according to a ranking of performances of said in-store marketing and merchandising elements based on the response measurements.

2. The method according to claim 1, wherein the method further comprises a step of extrapolating the datasets to get a chain-wide datasets for at least a chain, and associating the extrapolated datasets with planogram, layout of stores, total population of store areas, and predefined characteristics of behavior.

3. The method according to claim 1, wherein the method further comprises a step of breaking down intermediate stages of the shopper interaction funnel models, designing specific measurement metrics for each intermediate stage, and applying measurement metrics for the response measurements in order to understand the impact of marketing, wherein the types of metrics comprise change in category dynamics, category traffic, category penetration, category conversion rates, activity map, shopping time, shopper demographics, primary and secondary destinations, change in shopper behavior, direction of the travel, change in immediate reaction as reach for product, and change in sales.

4. The method according to claim 1, wherein the method further comprises a step of correlating a plurality of response measurements in a combination of a plurality of shopper interaction funnel models, and calculating an impact that a marketing and merchandising element has on a shopper interaction funnel model of another marketing and merchandising element.

5. The method according to claim 1, wherein the method further comprises a step of converting the datasets among a plurality of shopper interaction funnel models comprising time share, category share, and dollar share of customers into standardized outputs through a process of normalization and comparing the standardized outputs, wherein different weights are calculated depending on environments of the marketing and merchandising elements where the shopper interaction funnel models are formulated.

6. The method according to claim 1, wherein the method further comprises a step of measuring the impact of first marketing and merchandising elements through the measurement of changes occurring in the shopper interaction funnel models of second marketing and merchandising elements.

7. An apparatus for collecting in-store responses and datasets of people tied to marketing and merchandising elements, comprising:
   a video processing unit comprising at least a camera that is connected to at least a video interface continuously capturing video images in a retail environment,
   a memory storing computer executable instructions, and
   a computer operatively coupled to the memory that executes the instructions and configured to perform the steps of:
   a) receiving, from the video processing unit, a set of video images,
   b) converting the set of video images to audience data by executing a video processing algorithm, wherein each video image comprises image data and audience data that comprises behavior, demographic, and emotion data,
   c) analyzing a plurality of input images to estimate shopper interactions, segmentation, impression level, valences and magnitudes of emotion change, and a unified emotional response of the people, wherein the analysis includes executing computer vision algorithms and 3D facial pose estimation algorithms on the input images, wherein a unified emotional response is considered the persuasiveness of a set of marketing and merchandising elements, wherein a persuasiveness is calculated by and equation $$\text{persuasiveness} = \frac{k}{Total_{impressions}} \sum_{n=1}^{k} \partial emotion_n,$$

wherein k is a total number of impressions that had an emotional response to the set of marketing or merchandising elements and demotion is the change in response associated with the nth impression,
   d) measuring the responses of the people tied to marketing and merchandising elements based on the analysis for shopper interactions, segmentation, impression level, valences of emotion change, and a unified emotional response,
   e) creating one or more datasets by accumulating the response measurements,
   f) segmenting the datasets according to demographic information of the people,
   g) formulating one or more in-store shopper interaction funnel models in relation to the response measurements, wherein the shopper interaction funnel models allow a systematic consideration of conversion rates at multiple stages of shopper interaction along with related response measurements, wherein the shopper interaction funnel models are organized in a data structure that includes a tree structure or a linked list,
   h) correlating the response measurements with conversion rates at multiple stages of shopper interaction,
   i) linking the multiple in-store shopper interaction funnel models, defining a set of intersecting behaviors and calculating a sum of numbers between two linked shopper interaction funnel models for an analysis of the response measurements wherein a computer vision-based demographic composition measurement technology measures the demographic information, and wherein the method normalizes values of the datasets,
   j) measuring the impact of a first set of marketing and merchandising elements through the measurement of changes occurring in the shopper interaction funnel models of a second set of marketing and merchandising elements, wherein the impact is measured through an equation $\gamma = \sqrt{\alpha^2 + \beta^2 + \eta\alpha\beta}$, wherein $\gamma$ is a combined funnel of funnels $\alpha$ and $\beta$, wherein $\eta$ is a coupling factor between the two funnels that determines whether the first and second set of marketing and merchandising elements support, oppose or do not have an effect on each other, and
   k) optimizing the funnel model using the in-store marketing and merchandising elements according to a ranking of performances of said in-store marketing and merchandising elements based on the response measurements.

8. The apparatus according to claim 7, wherein the apparatus further comprises instructions in the memory that, when executed, extrapolate the datasets to get a chain-wide datasets for at least a chain, and associating the extrapolated datasets with planogram, layout of stores, total population of store areas, and predefined characteristics of behavior.

9. The apparatus according to claim 7, wherein the apparatus further comprises instructions in the memory that, when executed, break down intermediate stages of the shopper interaction funnel models, designing specific measurement metrics for each intermediate stage, and applying measurement metrics for the response measurements in order to understand the impact of marketing, wherein the types of metrics comprise change in category dynamics, category traffic, category penetration, category conversion rates, activity map, shopping time, shopper demographics, primary and secondary destinations, change in shopper behavior, direction of the travel, change in immediate reaction as reach for product, and change in sales.

10. The apparatus according to claim 7, wherein the apparatus further comprises instructions in the memory that, when executed, correlate a plurality of response measurements in a combination of a plurality of shopper interaction funnel models, and calculating an impact that a marketing and merchandising element has on a shopper interaction funnel model of another marketing and merchandising element.

11. The apparatus according to claim 7, wherein the apparatus further comprises instructions in the memory that, when executed, convert the datasets among a plurality of shopper interaction funnel models comprising time share, category share, and dollar share of customers into standardized outputs through a process of normalization and comparing the standardized outputs, wherein different weights are calculated depending on environments of the marketing and merchandising elements where the shopper interaction funnel models are formulated.

12. The apparatus according to claim 7, wherein the apparatus further comprises instructions in the memory that, when executed, measure the impact of first marketing and merchandising elements through the measurement of changes occurring in the shopper interaction funnel models of second marketing and merchandising elements.

\* \* \* \* \*